(12) United States Patent
Yu et al.

(10) Patent No.: US 8,279,920 B2
(45) Date of Patent: Oct. 2, 2012

(54) INTRA-FRAME PREDICTION METHOD AND PREDICTION APPARATUS USING THE SAME

(75) Inventors: Xin-Yang Yu, Shanghai (CN); Zahid Hussain, Ascot England (GB); Wei Wang, Shanghai (CN); Jiang-Ming Xu, San Jose, CA (US); Min-Jie Huang, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 355 days.

(21) Appl. No.: 12/555,166

(22) Filed: Sep. 8, 2009

(65) Prior Publication Data

US 2010/0246678 A1    Sep. 30, 2010

(30) Foreign Application Priority Data

Mar. 24, 2009  (CN) .......................... 2009 1 0119718

(51) Int. Cl.
*H04B 1/66* (2006.01)
*H04N 7/12* (2006.01)
*H04N 11/02* (2006.01)
*H04N 11/04* (2006.01)

(52) U.S. Cl. ............... 375/240.01; 375/240.12; 375/240
(58) Field of Classification Search ...... 375/240–240.29
See application file for complete search history.

(56) References Cited

U.S. PATENT DOCUMENTS

2003/0223645 A1    12/2003  Sun et al.
2006/0088103 A1*    4/2006  Kanehara ................. 375/240.16

FOREIGN PATENT DOCUMENTS

JP    2008118607    5/2008
WO    03105070    12/2003

* cited by examiner

*Primary Examiner* — Kwang B Yao
*Assistant Examiner* — Adam Duda
(74) *Attorney, Agent, or Firm* — J.C. Patents

(57) ABSTRACT

An intra-frame prediction method and a prediction apparatus using the same are provided. The prediction apparatus includes an input data unit, a control unit, an selection unit, a processing unit, and an output data selecting unit. The input data unit provides surroundings pixels of a predicted block. The control unit provides an input selection signal, a computing parameter, and an output selection signal. The selection unit selects the surroundings pixels according to the input selection signal. The processing unit computes the selected surroundings pixels for producing a plurality of results according to the computing signal. The output data unit selects results according to the output selection signal.

11 Claims, 5 Drawing Sheets

INTRA-FRAME PREDICTION METHOD AND PREDICTION APPARATUS USING THE SAME

CROSS-REFERENCE TO RELATED APPLICATION

This application claims the priority benefit of China application serial no. 200910119718.1, filed Mar. 24, 2009. The entirety of the above-mentioned patent application is hereby incorporated by reference herein and made a part of specification.

BACKGROUND OF THE INVENTION

1. Field of the Invention

The present invention relates to a video processing and particularly relates to an intra-frame prediction method for realizing every kind of intra-frame prediction algorithm and an apparatus thereof.

2. Description of Related Art

Intra-frame prediction is one technique adopted in video encoding and decoding standards H.264 and AVS. The technique utilizes pixel surrounding a block to obtain values of the block. It is to say, intra-frame prediction can enhance encoding efficiency. Generally, in high definition (such as 1920×1088) H.264 or AVS application, a special hardware, such as acceleration electronic circuit, is required for practicing intra-frame prediction.

Take H.264 video encoding and decoding standard as an example, its intra-frame prediction has two types, one is luminance prediction and the other is chrominance prediction. Luminance prediction of the standard has three different prediction blocks, which are—4×4 size, 8×8 size, and 16×16 size. More detail, there are 9 prediction modes for a 4×4 block, 9 prediction modes for a 8×8 block, and 4 prediction modes for a 16×16 block. The way for predicting a 4×4 block is similar to a 8×8 block, but the predicting the 8×8 block may use more surrounding pixel. In addition, 16 pixels can once be obtained in practicing a 4×4 block prediction, and more than 16 pixels (maybe 64 pixels) can be gained in an 8×8 block prediction. Chrominance prediction of H.264 video encoding and decoding standard is practiced based on—a 4×4 size block; and it has 4 prediction modes.

Furthermore, take AVS video encoding and decoding standard as another example, it has only one prediction block, which is 8×8 size. There are 5 prediction modes for practicing luminance prediction, and 4 prediction modes for executing chrominance prediction.

A conventional method for realizing high definition application of H.264 and AVS is to place a special electronic circuit for each prediction mode. For example, for H.264 standard, a 4×4 block may need 9 dedicated circuits for the 9 prediction modes. It can be anticipated that at least twenty-two dedicated circuits are required if all prediction modes are provided for practicing H.264 standard. In a worse case, assume both H.264 standard and AVS standard are supported, it requires at least 31 circuits. From what has been discussed above, the conventional art consumes hardware resources. Sometimes, the conventional art can hardly meet a real-time decoding requirement.

SUMMARY OF THE INVENTION

An intra-frame prediction method and an apparatus thereof for realizing intra-frame prediction algorithm.

An intra-frame prediction apparatus includes an input data unit, a control unit, a selection unit, a processing unit, and an output data unit. The input data unit provides surrounding pixels of a predicted block. The control unit provides an input selection signal, a computing signal, and an output selection signal. The selection unit is coupled to the input data unit and control unit. The selection unit selects the pixels according to the input selection signal. The processing unit is coupled to the selection unit. The processing unit computes the selected pixels according to the computing signal for producing a plurality of results. The selection unit is coupled to the input data unit and control unit. The output data unit selects results according to the output selection signal.

An intra-frame prediction method includes the following steps. First, surrounding pixels of a predicted block are provided, and an input selection signal, a computing signal, and an output selection signal are provided. The pixels are selected according to the input selection signal. The selected pixels are computed according to the computing signal for producing a plurality of results. The results are selective outputted according to the output selection signal.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 schematically illustrates a 4×4 block and its surrounding pixels according to an exemplary embodiment of the present invention.

FIG. 2 schematically illustrates an 8×8 block and its surrounding pixels according to an exemplary embodiment of the present invention.

DESCRIPTION OF EMBODIMENTS

Figure 3:
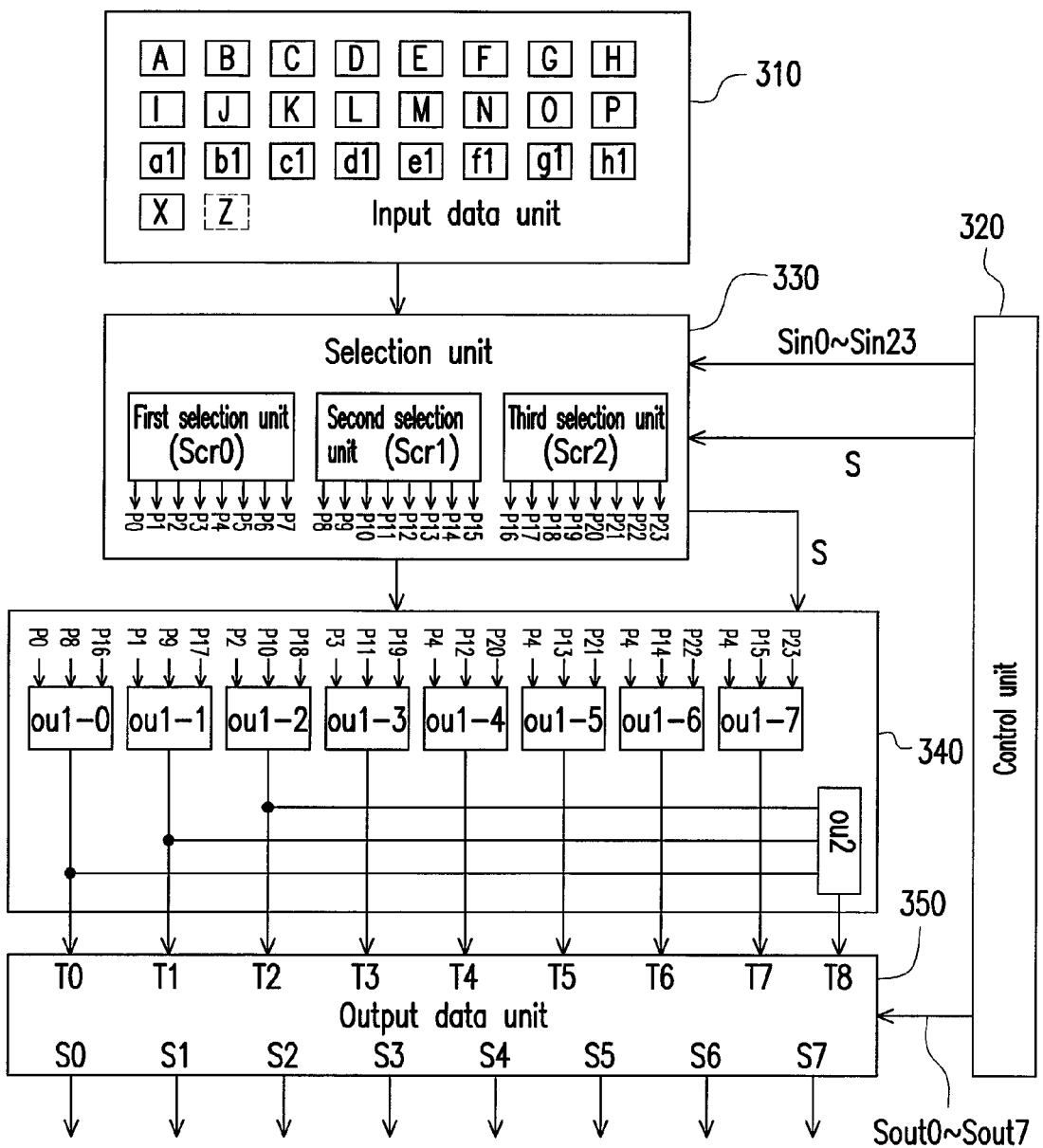
FIG. 3 schematically illustrates an intra-frame prediction apparatus of an exemplary embodiment of the present invention.

Recently, video encoding and decoding standards, such as H.264 and AVS adopt intra-frame prediction to enhance encoding efficiency. The technique especially has notable effect on high definition (1920×1088) applications. In the following exemplary embodiments, H.264 and AVS video encoding and decoding standards will be taken as examples for explaining the invention.

Figure 1:
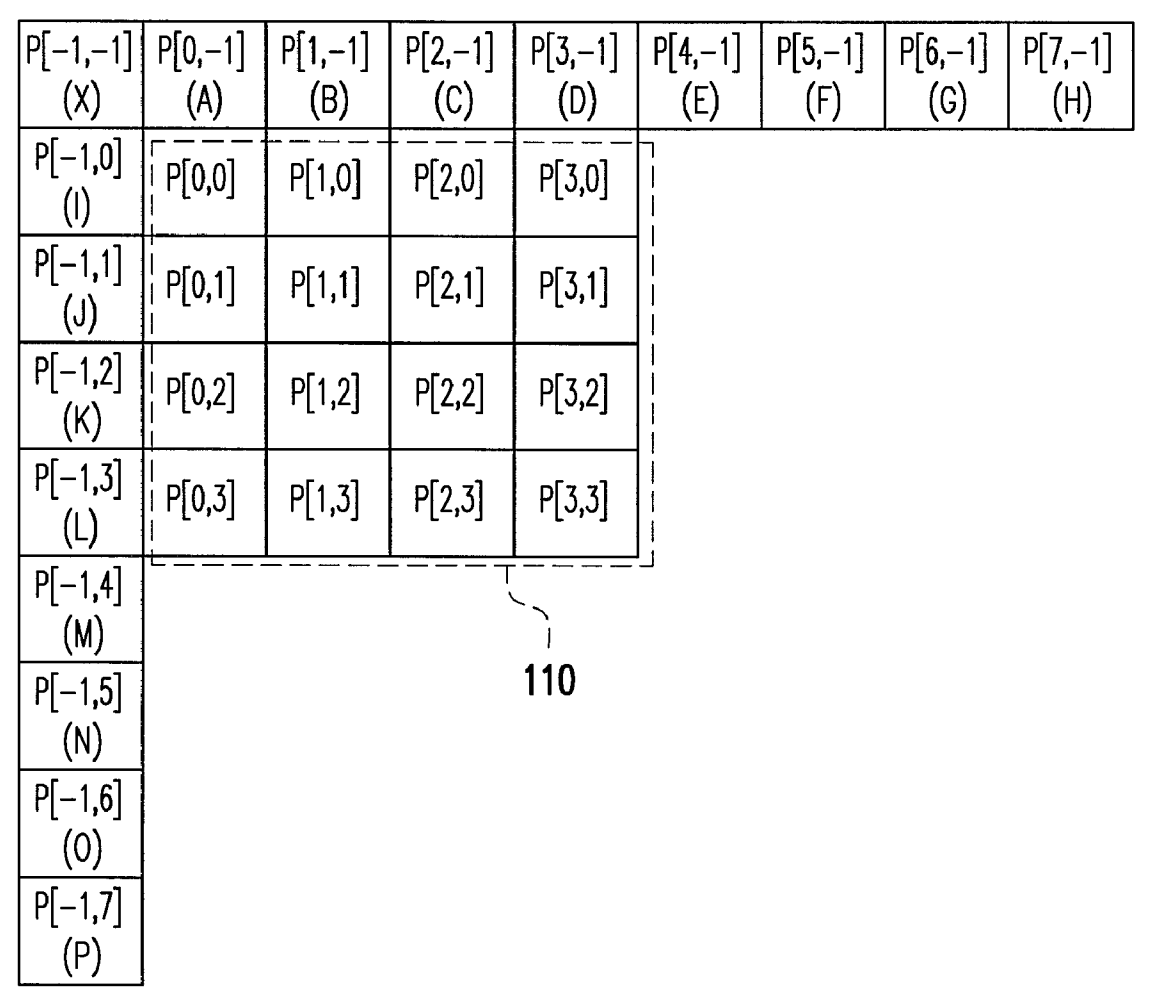
Figure 2:
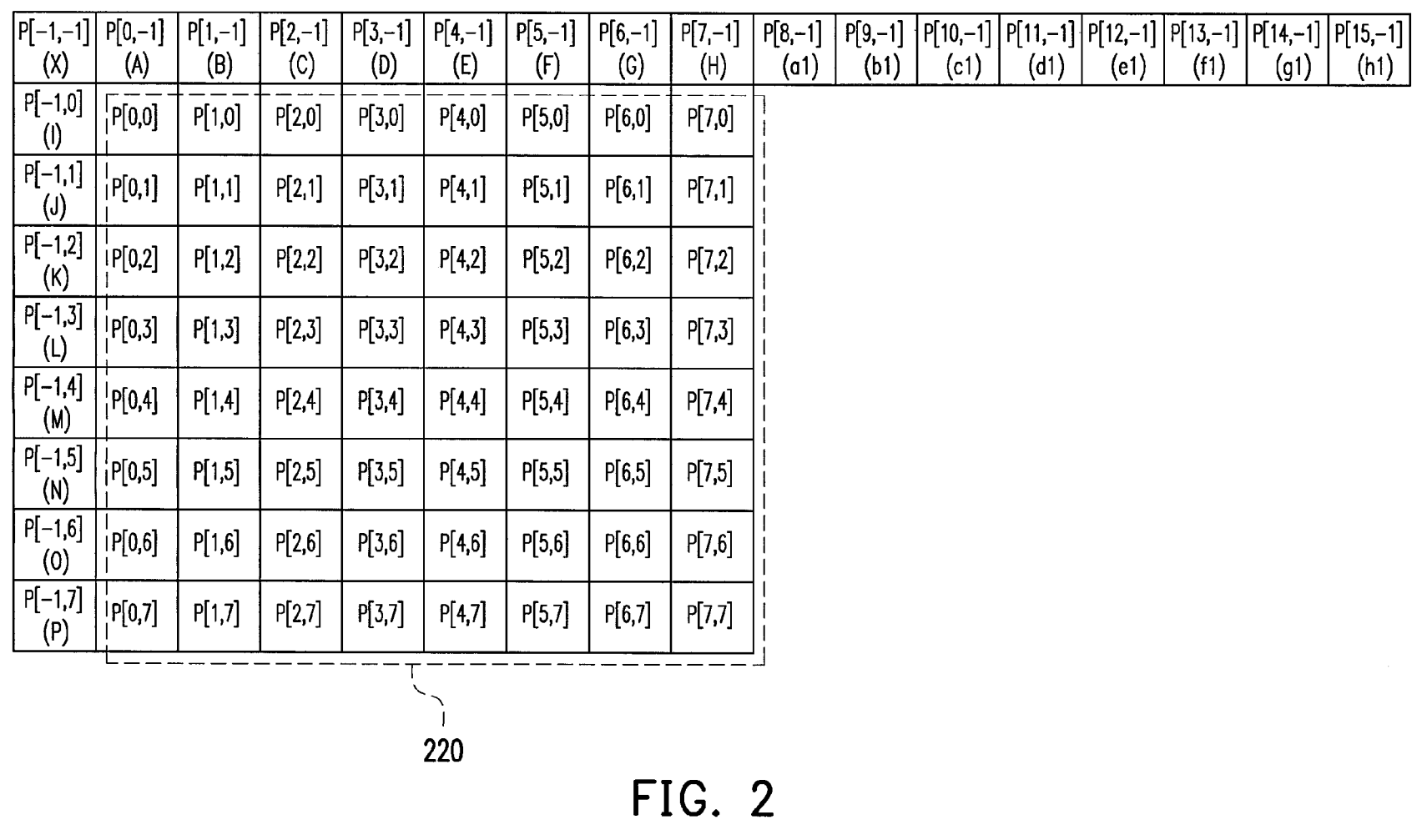

Intra-frame prediction utilizes pixels surrounding a prediction bloc (i.e. a block which is going to be predicted) to obtain pixels of the prediction block. FIG. 1 schematically illustrates a prediction block and its surrounding pixels. In this embodiment, a 4×4 size luminance prediction and a 4×4 size chrominance prediction are implemented. As shown in FIG. 1, the prediction block 110 is 4×4 size. In the embodiment, part of or all of the surrounding pixels (i.e. pixels A-H, I-P, and X) around the prediction block 110 are used to obtain pixels of the prediction block 110 (i.e. P[0,0]~P[3,3]). FIG. 2 schematically illustrates a prediction block 220 and its surrounding pixels. In this embodiment, an 8×8 size luminance prediction and a 8×8 size chrominance prediction are implemented. As shown in FIG. 2, the prediction block is 8×8 size. The embodiment, similarly, part of or all of the surrounding pixels (pixels A-H, a1-h1, and X) of the prediction block 220 are used to obtain pixels of the prediction block 220 (i.e. P[0,0]~P[7,7]). It should be noticed that values illustrated in FIG. 1 and FIG. 2 do not necessary mean their real coordinates on a display device.

The previous embodiments only illustrate a 4×4 size prediction block and a 8×8 size prediction block, but those prediction blocks with various size, for example, a 16×16 size prediction block, should be understood by ordinary skill in the art.

The following will give a detail discussion about the embodiments.

In FIG. 1, pixel X is written as "P[−1,−1]", pixels A, B, C, D, E, F, G, H are sequentially written as P[x,−1]~P[7,−1], and pixels I, J, K, L, M, N, O, P are sequentially written as P[−1,y]~P[−1,7]. For H.264 video encoding and decoding standard, intra-frame prediction is practiced by computing 17 surrounding pixels P[−1,−1], P[x,−1]~P[7,−1] and P[−1,y] ~P[−1,7] to obtain pixels P[0,0]~P[3,3] of the prediction block 110.

According what has been discussed above, luminance prediction of H.264 standard, there are 9 prediction modes for a 4×4 size block. They are named mode 0~mode 8. In addition, each prediction mode has an individual formula. The following will talk about the formulae by reference to FIG. 1. The symbols—x and y range from 0 to 3 if not specified; ">>" and "<<" respectively represent operations of "shifting to the right" and "shifting to the left." For example, "U<<V" means a value U is left shifted by V digits, and "U>>V" means the value U is right shifted by V digits. Formulae of the 9 modes are as follows:

Mode 0 (Intra_4×4_Vertical mode of H.264)
  P[x,y] = P[x,−1]
Mode 1 (Intra_4×4_Horizontal mode of H.264)
  P[x,y] = P[−1, y]
Mode 2 (Intra_4×4_DC mode of H.264)
  If LT=3: when pixel values P[x, −1] and P[−1, y] (wherein x and y range from 0 to 7)
    are all available,
    P[x,y]=(P[0,−1]+P[1,−1]+P[2,−1]+P[3,−1]+P[−1,0]+P[−1,1]+P[−1,2]+P[−1,3]+4)>>3.
  If LT=1: when pixels P[−1,y] (wherein y ranges from 0 to 7) are available,
    P[x,y]=(P[−1,0]+P[−1,1]+P[−1,2]+P[−1,3] + 2)>>2.
  If LT=2: when pixels P[x,−1] (wherein x a ranges from 0 to 7) are available,
    P[x,y]=(P[0,−1]+P[1,−1]+P[2,−1]+P[3,−1] + 2)>>2.
   If LT=0: otherwise,
    P[x,y]=128.
Mode 3 (Intra_4×4_Diagonal_Down_Left mode of H.264)
  If x=3 and y=3,
    P[x,y] = (P[6,−1] + 3*P[7,−1] + 2)>>2;
  otherwise,
    P[x,y]=(P[x+y,−1]+2*P[x+y+1,−1]+P[x+y+2,−1]+2)>>2.
Mode 4 (Intra_4×4_Diagonal_Down_Right mode of H.264)
  If x>y,
    P[x,y]=(P[x−y−2,−1]+2*P[x−y−1,−1]+P[x−y,−1]+2)>>2;
  if x<y,
    P[x,y]=(P[−1,y−x−2]+2*P[−1,y−x−1]+P[−1,y−x]+2)>>2;
  otherwise,
    P[x,y] = (P[0,−1] + 2*P[−1,−1] + P[−1,0] + 2)>>2.
Mode 5 (Intra_4×4_Vertical_Right mode of H.264)
  If 2*x−y=0, 2, 4, 6,
    P[x,y] = (P[x−(y>>1)−1,−1] + P[x−(y>>1),−1] + 1)>>1;
  if 2*x−y=1, 3, 5,
    P[x,y] = (P[x−(y>>1)−2,−1] + 2*P[x−(y>>1)−1,−1] + P[x−(y>>1),−1] + 2)>>2;
  if 2*x−y=−1,
    P[x,y] = (P[−1,0]+2*P[−1,−1]+P[0,−1]+2)>>2;
  otherwise,
    P[x,y] = (P[−1,y−1]+2*P[−1,y−2]+P[−1,y−3]+2)>>2
Mode 6 (Intra_4×4_Horizontal mode of H.264)
  If 2*y−x=0, 2, 4, 6,
    P[x,y] = (P[−1,y−(x>>1)−1] + P[−1,y−(x>>1)] + 1)>>1;
  if 2*y−x=1, 3, 5,
    P[x,y] = (P[−1,y−(x>>1)−2] + 2*P[−1,y−(x>>1)−1] + P[−1,y−(x>>1)] + 2)>>2;
  if 2*y−x=−1,
    P[x,y] = (P[−1,0]+2*P[−1,−1]+P[0,−1]+2)>>2;
  otherwise,
    P[x,y] = (P[x−1,−1] + 2*P[x−2,−1] + P[x−3,−1] + 2)>>2.
Mode 7 (Intra_4×4_Vertical_Left mode of H.264)
  If y=0, 2,
    P[x,y] = (P[x+(y>>1),−1] + P[x+(y>>1)+1,−1] + 1)>>1;
  otherwise (i.e., y=1,3),
    P[x,y] = (P[x+(y>>1),−1] + 2*P[x+(y>>1)+1,−1] + P[x+(y>>1)+2,−1] + 2)>>2.
Mode 8 (Intra_4×4_Horizontal_Up mode of H.264)
  If x+2*y=0, 2, 4,
    P[x,y] = (P[−1,y+(x>>1)] + P[−1,y+(x>>1)+1] + 1)>>1;
  if x+2*y=1, 3,
    P[x,y] = (P[−1,y+(x>>1)] + 2*P[−1,y+(x>>1)+1] + P[−1,y+(x>>1)+2] + 2)>>2;

-continued

```
if x+2*y=5,
    P[x,y] = (P[-1,2] + 3*P[-1,3] + 2)>>2;
otherwise (i.e., x+2*y>5),
    P[x,y] = P[-1,3].
```

FIG. 2 illustrates an 8×8 size prediction block 220 and its surrounding pixels. Values of pixels a1, b1, d1, e1, f1, g1, and h1 are sequentially represented by P[8,−1]~P[15, −1]. For H.264 video encoding and decoding standard, a 8×8 size prediction block is achieved by predicting pixels of the prediction block 220 (i.e. P[x,y], x and y range from 0 to 7) based on the 25 surrounding pixels—X, A-H, a1-h1, and I-P.

The 9 modes of luminance prediction for 8×8 size are respectively named mode 0~mode 8. In the embodiment, there are two steps to obtain pixels of the prediction block 220. The first one is to acquire pixels P'[−1,−1], P'[0,−1]~P'[15,−1] and P'[−1,0]~P'''[−1, 7] according to pixels X, A-H, a1-h1, and I-P. There are different formulae for pixels in different positions, the followings are examples:

```
for calculating P'[0,−1]
    if P[−1,−1] is available, thus
        P'[0,−1] = (P[−1,−1] + 2*P[0,−1] + P[1,−1] + 2)>>2;
    otherwise,
        P'[0,−1] = (3*P[0,−1] + P[1,−1] + 2)>>2.
for calculating P'[x,−1], x=1~14
```

-continued

```
        P'[x,−1] = (P[x−1,−1] + 2*P[x,−1] + P[x+1,−1] + 2)>>2
    for calculating P'[15,−1]
        P'[15,−1] = (P[14,−1] + 3*P[15,−1] + 2)>>2
    for calculating P'[−1,−1]
        if P[0,−1] and P[−1,0] are available, thus
            P'[−1,−1] = (P[0,−1] + 2*P[−1,−1] + P[−1,0] + 2)>>2;
        if P[0,−1] is available, thus
            P'[−1,−1] = (3*P[−1,−1] + P[0,−1] + 2)>>2;
        otherwise,
            P'[−1,−1] = (3*P[−1,−1] + P[−1,0] + 2)>>2.
    for calculating P'[−1,0]
        if P[−1,−1] is available, thus
            P'[−1,0] = (P[−1,−1] + 2*P[−1,0] + P[−1,1] + 2)>>2;
        otherwise,
            P'[−1,0] = (3*P[−1,0] + P[1,−1] + 2)>>2.
    for calculating P'[−1,y], y=1~6
        P'[−1,y] = (P[−1,y−1] + 2*P[−1,y] + P[−1,y+1] + 2)>>2
    for calculating P'[−1,7]
        P'[−1,7] = (P[−1,6] + 3*P[−1,0] + 2)>>2
```

The second step is to obtain pixel P[0,0]~P[7,7] of the prediction block 210 based on pixel P'[−1,−1], P'[x,−1]~P'[15,−1] and P'[−1,y]~P'[−1,7]. Similarly, each prediction modes has its own formulae shown as follows:

```
Mode 0 (Intra_8x8_Vertical mode of H.264)
    P[x,y] = P'[x,−1]
Mode 1 (Intra_8x8_Horizontal mode of H.264)
    P[x,y] = P'[−1,y]
Mode 2 (Intra_8x8_DC mode of H.264)
    If LT=3: when pixel values P[x,−1], and P[−1,y] are all available,
        P[x,y]=(P'[0,−1]+P'[1,−1]+P'[2,−1]+P'[3,−1]+P'[4,−1]+P'[5,−1]+P'[6,−1]+P'[7,−1]
            +P'[−1,0]+P'[−1,1]+P'[−1,2]+P'[−1,3]+P'[−1,4]+P'[−1,5]+P'[−1,6]+P'[−1,
            7] + 8)>>4.
    If LT=1: when pixels P[−1,y] are available,
        P[x,y]=(P'[−1,0]+P'[−1,1]+P'[−1,2]+P'[−1,3]+P'[−1,4]+P'[−1,5]+P'[−1,6]+P'[−1,7]
            + 4)>>3.
    If LT=2: when pixels P[x,−1](x is 0~7) are available,
        P[x,y]=(P'[0,−1]+P'[1,−1]+P'[2,−1]+P'[3,−1]+P'[4,−1]+P'[5,−1]+P'[6,−1]+P'[7,−1]
            + 4)>>3.
    If LT=0: otherwise,
        P[x,y]=128.
Mode 3 (Intra_8x8_Diagonal_Down_Left mode of H.264)
    if x=7 and y=7,
        P[x,y] = (P'[14,−1] + 3*P'[15,−1] + 2)>>2;
    otherwise,
        P[x,y] = (P'[x+y,−1] + 2*P'[x+y+1,−1] + P'[x+y+2,−1] + 2)>>2.
Mode 4 (Intra_8x8_Diagonal_Down_Right mode of H.264)
    if x>y,
        P[x,y]=(P'[x−y−2,−1]+2*P'[x−y−1,−1]+P'[x−y,−1]+2)>>2;
    if x<y,
        P[x,y]=(P'[−1,y−x−2]+2*P'[−1,y−x−1]+P'[−1,y−x]+2)>>2;
    otherwise,
        P[x,y] = (P'[0,−1] + 2*P'[−1,−1] + P'[−1,0] + 2)>>2.
Mode 5 (Intra_8x8_Vertical_Right mode of H.264)
    if 2*x−y=0, 2, 4, 6, 8, 10, 12, 14,
        P[x,y] = (P'[x−(y>>1)−1,−1] + P'[x−(y>>1),−1] + 1)>>1;
    if 2*x−y=1, 3, 5, 7, 9, 11, 13,
        P[x,y] = (P'[x−(y>>1)−2,−1] + 2*P'[x−(y>>1)−1,−1] + P'[x−(y>>1),−1] + 2)>>2;
    if 2*x−y=−1,
        P[x,y] = (P'[−1,0] + 2*P'[−1,−1] + P'[0,−1] + 2)>>2;
    otherwise (i.e., 2*x−y=−2, −3, −4, −5, −6, −7),
        P[x,y] = (P'[−1,y−2*x−1] + 2*P'[−1,y−2*x−2] + P'[−1,y−2*x−3] + 2)>>2.
Mode 6 (Intra_8x8_Horizontal mode of H.264)
    if 2*y−x=0, 2, 4, 6, 8, 10, 12, 14,
        P[x,y] = (P'[−1,y−(x>>1)−1] + P'[−1,y−(x>>1)] + 1)>>1;
    if 2*y−x=1, 3, 5, 7, 9, 11, 13,
```

```
    P[x,y] = (P'[-1,y-(x>>1)-2] + 2*P'[-1,y-(x>>1)-1] + P'[-1,y-(x>>1)] + 2)>>2;
  if 2*y-x=-1,
    P[x,y] = (P'[-1,0] + 2*P'[-1,-1] + P'[0,-1] + 2)>>2;
  otherwise (i.e., 2*x-y=-2, -3, -4, -5, -6, -7),
    P[x,y] = (P'[x-2*y-1,-1] + 2*P'[x-2*y-2,-1] + P'[x-2*y-3,-1] + 2)>>2.
Mode 7 (Intra_8x8_Vertical_Left mode of H.264)
  If y=0, 2, 4, 6,
    P[x,y] = (P'[x+(y>>1),-1] + P'[x+(y>>1)+1,-1] + 1)>>1;
  otherwise (i.e., y=1, 3, 5, 7),
    P[x,y] = (P'[x+(y>>1),-1] + 2*P'[x+(y>>1)+1,-1] + P'[x+(y>>1)+2,-1] + 2)>>2
Mode 8 (Intra_8x8_Horizontal_Up mode of H.264)
  if x+2*y=0, 2, 4, 6, 8, 10, 12,
    P[x,y] = (P'[-1,y+(x>>1)] + P'[-1,y+(x>>1)+1] + 1)>>1;
  if x+2*y=1, 3, 5, 7, 9, 11,
    P[x,y] = (P'[-1,y+(x>>1)] + 2*P'[-1,y+(x>>1)+1] + P'[-1,y+(x>>1)+2] + 2)>>2;
  if x+2*y=13,
    P[x,y] = (P'[-1,6] + 3*P'[-1,7] + 2)>>2;
  otherwise (i.e., x+2*y>13),
    P[x,y] = P'[-1,7].
```

As it has been discussed above, chrominance prediction of H.264 standard has 4 prediction modes—mode 0~mode 3. Chrominance prediction is practiced based on a 4×4 size block, no matter what real size of the prediction block is. In other words, a way to obtain a prediction block with either 4×4, 4×8 or 8×8 is the same. The following will give an example for an 8×8 size prediction block. Formulae of the prediction modes for a 8×8 size prediction block are as follows:

```
Mode 0 (Intra_Chroma_DC mode of H.264)
  I. For pixels P[x,y], wherein x and y range from 0 to 3, and pixel values P[x,y],
     wherein x and y range from 4 to 7,
       if LT=3, pixel values P[x,-1], P[-1,y] (wherein x and y range from 0 to 7 are
         available),
         P[x,y]=(P[0,-1]+P[1,-1]+P[2,-1]+P[3,-1]+P[-1,0]+P[-1,1]+P[-1,2]+P[-1,3] +
           4)>>3   (wherein x and y range from 0 to 3)
         P[x,y]=(P[4,-1]+P[5,-1]+P[6,-1]+P[7,-1]+P[-1,4]+P[-1,5]+P[-1,6]+P[-1,7] +
           4)>>3   (wherein x and y range from 4 to 7);
       if LT=1, pixels P[-1,y] (wherein y=0~7) are available,
         P[x,y]=(P[-1,0]+P[-1,1]+P[-1,2]+P[-1,3]+2)>>2
           (wherein x and y range from 0 to 3)
         P[x,y]=(P[-1,4]+P[-1,5]+P[-1,6]+P[-1,7]+2)>>2
           (wherein x and y range from 4 to 7);
       if LT=2, pixels P[x,-1](x are 0~7) are available,
         P[x,y]=(P[0,-1]+P[1,-1]+P[2,-1]+P[3,-1]+2)>>2
           (wherein x and Y range from 0 to 3)
         P[x,y]=(P[4,-1]+P[5,-1]+P[6,-1]+P[7,-1]+2)>>2
           (wherein x and y range from 4 to 7);
       Otherwise - LT=0,
         P[x,y]=128    (wherein x and y range from either 0 to 3 or 4 to 7).
  II. For pixels P[x,y] (wherein x ranges from 4 to 7 and y ranges from 0 to 3),
       If LT=2, pixels P[x,-1] (wherein x=4~7) are available,
         P[x,y]=(P[4,-1]+P[5,-1]+P[6,-1]+P[7,-1]+2)>>2
           (wherein x ranges from 4 to 7 and y ranges from 0 to 3);
       if LT=1, pixels P[-1,y] (wherein y ranges from 0 to 3) are available,
         P[x,y]=(P[-1,0]+P[-1,1]+P[-1,2]+P[-1,3]+2)>>2
           (wherein x ranges from 4 to 7 and y ranges from 0 to 3);
       otherwise,
         P[x,y]=128 (wherein x ranges from 4 to 7 and y ranges from 0 to 3).
  III. For pixels P[x,y] (wherein x ranges from 0 to 3 and y ranges from 4 to 7).
       if LT=1, pixels P[-1,y] (wherein y ranges from 4 to 7) are available,
         P[x,y]=(P[-1,4]+P[-1,5]+P[-1,6]+P[-1,7]+2)>>2
           (wherein x ranges from 0 to 3 and y ranges from 4 to 7);
       if LT=2, pixels P[x,-1](x are 0~3) are available,
         P[x,y]=(P[0,-1]+P[1,-1]+P[2,-1]+P[3,-1]+2)>>2
           (wherein x ranges from 0 to 3 and y ranges from 4 to 7);
       otherwise,
         P[x,y]=128 (wherein x ranges from 0 to 3 and y ranges from 4 to 7).
Mode 1 (Intra_Chroma_Horizontal mode of H.264)
  P[x,y]=P'[-1,y] (wherein x ranges and y range from 0 to 7).
Mode 2 (Intra_Chroma_Vertical mode of H.264)
  P[x,y]=P'[x,-1] (wherein x ranges and y range from 0 to 7).
Mode 3 (Intra_Chroma_Plane mode of H.264)
```

The mode may need a special processing, and it is not discussed in the embodiment.

For AVS standard, intra-frame prediction is based on an 8×8 size block. Luminance of AVS standard has 5 prediction modes named mode 0~mode 4. The following shows exemplary formulae:

---

Mode 0 (Intra_8x8_Vertical mode of AVS)
    P[x,y]=P'[x,−1] (wherein x ranges and y range from 0 to 7).
Mode 1 (Intra_8x8_Horizontal mode of AVS)
    P[x,y]=P'[−1,y] (wherein x ranges and y range from 0 to 7).
Mode 2 (Intra_8x8_DC mode of AVS)

---

There are two steps, the first one is same with the first step of the 8×8 size luminance prediction on H.264 standard. The detail processes are described in section [0027].

The second step is:

---

If LT=3: when P[x,−1], and P[−1,y] are available,
    P[x,y]=(P'[x,−1] +P'[−1,y] )>>1 (wherein x ranges
    and y range from 0 to 7).
  if LT=1: pixels P[−1,y] are available,
    P[x,y]=P'[−1,y] (wherein x ranges and y range from 0 to 7).
    if LT=2: pixels P[x,−1] are available,
    P[x,y]=P'[x,−1] (wherein x ranges and y range from 0 to 7).
    if- LT=0: otherwise,
    P[x,y]=128 (wherein x ranges and y range from 0 to 3).
Mode 3 (Intra_8x8_Down_Left mode of AVS)

---

There are two steps, the first one is also similar to the first step of the 8×8 size luminance prediction on H.264 standard. The detail processes are described in section [0027].

The second step is:

---

P[x,y] = (P'[x+y+1,−1] + P'[−1,x+y+1])>>1.
Mode 4 (Intra_8x8_Down_Right mode of AVS)
  if x=y,
    P[x,y] = (P[−1,0] + 2*P[−1,−1] + P[0,−1] + 2)>>2;
  if x>y,
    P[x,y]=(P[x−y,−1]+2*P[x−y−1,−1]+P[x−y,−2]+2)>>2;
  otherwise (i.e., x<y),
    P[x,y]=(P[−1,y−x]+2*P[−1,y−x−1]+P[−1,y−x−2]+2)>>2.

---

Chrominance prediction of AVS standard has 4 prediction modes—which are mode 0~mode 3. The prediction is based on an 8×8 size block. The exemplary formulae are as follows:

---

Mode 0 (Intra_Chroma_DC mode of AVS)
  Processes of this mode are similar to Intra_8x8_DC mode of AVS.
Mode 1 (Intra_Chroma_Horizontal mode of AVS)
    P[x,y]=P[−1,y] (wherein x ranges and y range from 0 to 7).
Mode 2 (Intra_Chroma_Vertical mode of AVS)
    P[x,y]=P'[x,−1] (wherein x ranges and y range from 0 to 7).
Mode 3 (Intra_Chroma_Plane mode of AVS)
  Processes of this mode are similar to Intra_Chroma_Plane mode of H.264.

---

All modes above can be substantially classed into two types. One is non-DC type, and the other is DC type. For those non-DC modes, there is a equation for calculating each pixel:

$$P[x,y]=(Src0+Src1<<C+Src2+R)>>S \qquad \text{(equation 1)}$$

wherein Src0, Src1 and Src2 are surrounding pixels selected in advance; C, R, and S are parameters. By giving parameters C, R and S for each corresponding pixel and properly choosing surrounding pixels Src0, Src1 and Src2, P[x, y] of a prediction block can be consequentially obtained.

Take Intra_4×4_Diagonal_Down_Left mode of H.264 standard as an example. For the pixel P[3, 3] of the prediction block, parameters: C=1, R=2 S=2, and surrounding pixels Src0=P[6,−1], Src1=P[7,−1] and Src2=P[7,−1] are selected. For the pixel P[3,2] of the prediction block, parameters: C=1, R=2, S=2, and surrounding pixels Src0=P[5,−1], Src1=P[6,−1] and Src2=P[7,−1] are chosen. So the steps are acquiring parameters C, R, and S and selecting surrounding pixels P[−1,−1], P[x,−1]~P[15,−1] and P[−1,y]~P[−1,7], then selecting appropriate control signals according to an operating mode.

Relationships of parameters C, R and S may be concluded as follows:
if S=0, thus R=0 and C=0;
if S=1, thus R=1 and C=0;
if S=2, thus R=2 and C=1.

However, there is an exception. In Intra_8×8_DC mode, if all surrounding pixels are available, parameters are given as C=0, R=0 and S=1. If parameter S is given, parameters C and R can be acquired by the following equations 2 and 3. In the Intra_8×8_DC mode, $$\text{parameter } R \text{ is either 0 or equal to } S \qquad \text{(equation 2)}.$$

$$C=R>>1 \qquad \text{(equation 3)}.$$

For those DC modes, their formulae may be summarized as follows:

$$P[x,y]=(ADD0+ADD1+ADD2+R')>>S' \qquad \text{(equation 4)}.$$

$$P[x,y]=((ADD0+ADD1+ADD2)+(ADD0'+ADD1'+ADD2')+R')>>S' \qquad \text{(equation 5)}.$$

The equation 4 is adapted for a prediction block which surrounding pixels are not larger than 8; and the equation 5 is suitable for a prediction block which surrounding pixels are more than 8. Here, ADD0, ADD1, ADD2, ADD0', ADD1' and ADD2' are computing results from equation 1 in DC mode. ADD0', ADD1' and ADD2' are obtained after ADD0, ADD1 and ADD2. In DC mode, parameters C, R and S are set to 0. R' and S' may be concluded as follows:
if S'=2, thus R'=2;
if S'=3, thus R'=4;
if S'=4, thus R'=8;

If parameter S is given, parameters S' and R' can be acquired through the following equations 6 and 7:

$$S'=S+1 \qquad \text{(equation 6)}.$$

$$R'=1<<S \qquad \text{(equation 7)}.$$

FIG. 3 schematically illustrates an apparatus 300 for implementing intra-frame prediction according to an exemplary embodiment of the present invention. The apparatus 300 includes an input data unit 310, a control unit 320, an selection unit 330, a processing unit 340, and an output data unit 350. The input data unit 310 provides values of surrounding pixels for a predicted block. Take FIG. 1 as an example, the input data unit 310 may provide values of the surrounding pixels A~H, I~P, and H of the predicted block 110. Take FIG. 2 as another example, the input data unit 310 may provide values of the surrounding pixels A-H, a1-h1, I-P, and X of the predicted block 210.

The input data unit 310 may be realizes by any means, such as a memory, or a latch. In the present exemplary embodiment, the input data unit 310 includes a plurality of registers. Amount of the registers used in the input data unit 310 depends upon how many intra-frame prediction modes the apparatus 300 supports. For example, if the apparatus 300 only supports Intra_4×4_DC mode of the H.264, then it requires 8 registers in the input data unit 310 for storing 8 surrounding pixels A, B, C, D, I, J, K, and L. As shown in FIG. 3, in order to support all intra-frame prediction modes of H.264 standard and AVS standard in the present exemplary embodiment, 26 registers are used for respectively storing surrounding pixels A-H, a1-h1, I-P, and X. More particularly, the register for storing pixel Z (i.e., "0" value) may be optional and can be omitted.

The control unit 320 provides input selection signals Sin0~Sin23, a computing signal S, and output selection signals Sout0~Sout7. The selection unit 330 is coupled to the input data unit 310 and the control unit 320 for selecting pixels according to the input selection signals Sin0~Sin23. The processing unit 340 is coupled to the selection unit 330 for computing the previously selected pixels according to the computing signal S to produce a plurality of results. The computing signal S as shown in FIG. 3 is provided by the control unit 320 and transmitted to the processing unit 340 through the selection unit 330. In other exemplary embodiments, the control unit 320 may directly provide the computing signal S to the processing unit 340. The output data unit 350 is coupled to the processing unit 340 and the selection control unit 320 for selecting the previously obtained results according to the output selection signal Sout0~Sout7.

In the present exemplary embodiment, an electronic circuit for computing 8 pixels is designed. For a 4×4 size predicted block, two calculations are required for respectively obtaining an upper half and a lower half of the predicted block. Take FIG. 1 as an example, the upper half pixels (i.e. P[0,0], P[1,0], P[2,0], P[3,0], P[0,1], P[1,1], P[2,1], P[3,1]) and the lower half pixels (i.e. P[0, 2], P[1, 2], P[2, 2], P[3, 2], P[0, 3], P[1, 3], P[2, 3], P[3, 3]) of the predicted block 110 are individually gained. For a 8×8 size predicted block, eight calculations are taken. Please refer to FIG. 2, sub-blocks-000, 001, 010, 011, 100, 101, and 111 of the predicted block 210 are respectively calculated. Sub-block 000 includes P [0, 0], P[1, 0], P[2, 0], P[3, 0], P[0, 1], P[1, 1], P[2, 1], and P[3, 1]. Sub-block 001 includes P[0, 2], P[1, 2], P[2, 2], P[3, 2], P[0, 3], P[1, 3], P[2, 3], and P[3, 3]. Sub-block 010 includes P[4, 0], P[5, 0], P[6, 0], P[7, 0], P[4, 1], P[5, 1], P[6, 1], and P[7, 1]. Sub-block 011 includes P[4, 2], P[5, 2], P[6, 2], P[7, 2], P[4, 3], P[5, 3], P[6, 3], and P[7, 3]. Sub-block 100 includes P[0, 4], P[1, 4], P[2, 4], P[3, 4], P[0, 5], P[1, 5], P[2, 5], and P[3, 5]. Sub-block 101 includes P[0, 6], P[1, 6], P[2, 6], P[3, 6], P[0, 7], P[1, 7], P[2, 7], and P[3, 7]. Sub-block 110 includes P[4, 4], P[5, 4], P[6, 4], P[7, 4], P[4, 5], P[5, 5], P[6, 5], and P[7, 5]. Sub-block 111 includes P[4, 6], P[5, 6], P[6, 6], P[7, 6], P[4, 7], P[5, 7], P[6, 7], and P[7, 7].

As a result, 8 operation units OU1-0, OU1-1, OU1-2, OU1-3, OU1-4, OU1-5, OU1-6, OU1-7, and another operation unit OUT2 are required for calculating the 8 pixels of the predicted block. If the intra-frame prediction apparatus 300 is designed for a 4×4 size block (i.e. 16 pixels), thus 16 operation units OU1-0~OU1-15 and another operation unit OUT2 are required in the processing unit 340. Accordingly, if the intra-frame prediction apparatus 300 is designed for a 8×8 size block (i.e. 64 pixels), then 64 operation unit OU1-0~OU1-63 and another operation unit OUT2—are required in the processing unit 340.

Figure 4:
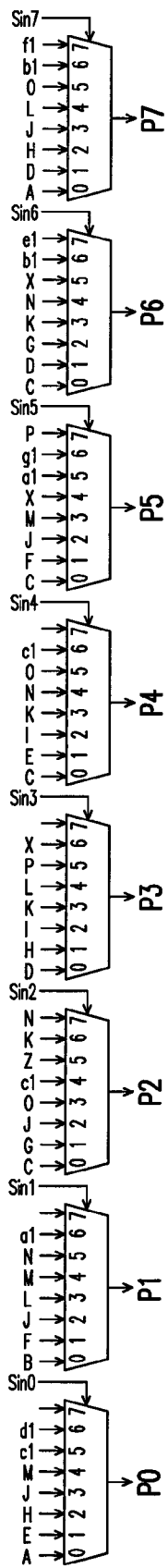
FIG. 4 schematically illustrates an exemplary embodiment of a first selection unit in an input selection unit of FIG. 3 according to the present invention FIG. 5 schematically illustrates an exemplary embodiment of a first computation unit in FIG. 3 according to the present invention.

The selection unit 330 has three selection devices for providing surrounding pixels Src0, Src1, and Src2 for operation units OU1-0~OU1-7. Table 1 illustrates a mapping table of input selection signals Sin0~Sin23 and selected surrounding pixels. The selection unit 330 may use table 1 for selecting surrounding pixels according to the input selection signals Sin0~Sin23. For example, if the input selection signals Sin0~Sin23 output from the control unit 320 are [0, 1, 3, 1, 2, 4, 5, 7, 0, 0, 0, 0, 1, 0, 0, 0, 4, 0, 0, 1, 0, 0, 0, 0], it means that the output P0~P7 of the first selection device are respectively A, F, O, H, I, X, X, f1 the output P8~P15 of the second selection unit are respectively B, C, D, H, F, D, A, C, and the output P16~P23 are respectively Z, D, B, G, A, A, B, B. In other words, surrounding pixel values Src0, Src1, and Src2 received by the operation units OU1-0~OU1-7 are [A,B,0], [F,C,D], [O,D,B], [H,H,G], [I,F,A], [X,D,A], [X,A,B], and [f1,C,B]. In the present exemplary embodiment, the output P0~P23 of the selection unit 330 are data selection apparatuses (or multiplexers). FIG. 4 illustrates an exemplary embodiment of the first selection device of the selection unit 33. The first selection device has 8 8-to-1 multiplexers. The multiplexers are coupled between the input data unit 310 and the processing unit 340. In addition, these multiplexers are respectively controlled by input selection signals Sin0~Sin7. Therefore, each multiplexer selects a surrounding pixel according to one input selection signals, then provides the selected pixel to the processing unit 340.

TABLE 1

A mapping table for input selection signals Sin0~Sin23 and the selected surrounding pixels

| Sin control value | Output of the first selection unit (controlled by Sin0~Sin7) | | | | | | | | Output of the second selection unit (controlled by Sin8~Sin15) | | | | | | | |
|---|---|---|---|---|---|---|---|---|---|---|---|---|---|---|---|---|
| | P0 | P1 | P2 | P3 | P4 | P5 | P6 | P7 | P8 | P9 | P10 | P11 | P12 | P13 | P14 | P15 |
| 0 | A | B | C | D | C | C | C | A | B | C | D | H | B | D | A | C |
| 1 | E | F | G | H | E | F | D | D | L | I | F | J | F | E | D | G |
| 2 | H | J | J | I | I | J | G | H | X | K | H | M | L | K | E | N |
| 3 | J | L | O | K | K | M | K | J | Z | Z | I | O | O | Z | H | X |
| 4 | M | M | c1 | L | N | X | N | L | a1 | F | J | Z | P | b1 | M | Z |
| 5 | c1 | N | Z | P | O | a1 | X | O | e1 | | Z | a1 | X | h1 | Z | c1 |
| 6 | d1 | a1 | K | X | c1 | g1 | b1 | b1 | O | | d1 | | b1 | G | f1 | g1 |
| 7 | | | N | | P | e1 | f1 | G | | | | | d1 | | J | |

| | Output of the third selection unit (controlled by Sin16~Sin23) | | | | | | | |
|---|---|---|---|---|---|---|---|---|
| Sin control value | P16 | P17 | P18 | P19 | P20 | P21 | P22 | P23 |
| 0 | C | D | B | C | A | A | B | B |
| 1 | D | E | E | G | G | D | E | F |
| 2 | I | L | I | I | L | E | F | I |

TABLE 1-continued

A mapping table for input selection signals Sin0~Sin23 and the selected surrounding pixels

| 3 | K  | O  | P  | N  | M  | H  | L  | K  |
|---|----|----|----|----|----|----|----|----|
| 4 | Z  | X  | X  | Z  | P  | L  | a1 | M  |
| 5 | b1 | Z  | Z  | b1 | a1 | N  | c1 | d1 |
| 6 | d1 | b1 | a1 |    | e1 | c1 | g1 | h1 |
| 7 | f1 |    | e1 |    |    | h1 | O  |    |

As mentioned above, the processing unit 340 includes 8 operation units OU1-0~OU1-7, they respectively computes Tn=(Src0+Src<<C+Src2+R)>>S (i.e., the above-described equation 1) according to the computing signal S and acquire results Tn (i.e., T0, T1, T2, T3, T4, T5, T6, and T7 in FIG. 3). Wherein Src0, Src1, and Src2 are pixels selected by the selection unit 330. Assume INTRA_8*8_DC mode of AVS is implemented, and surrounding pixels of a predicted block are all available. So R=0 or R=2 (i.e., the above-described equation 2). Besides, C=R>>1(i.e., the above-described equation 3). The control unit 320 provides a computing signal S, and computing signals R and C are therefore obtain by the operation units OU1-0~OU1-7. It should be noted that, operation units OU1-0~OU1-7 may not get the same computing signal S, it depends on the selection unit 320. For example, if the computing signal S is [2, 2, 1, 1, 2, 1, 2, 1, 0], it means that the computing signal S inputted to the operation unit OU1-0 is 2; the computing signal S inputted to the operation unit OU1-1 is also 2; the computing signal S inputted to the operation unit OU1-2 is 1, and so on. Accordingly, the computing signal S inputted to the operation unit OU2 is 0.

Figure 5:
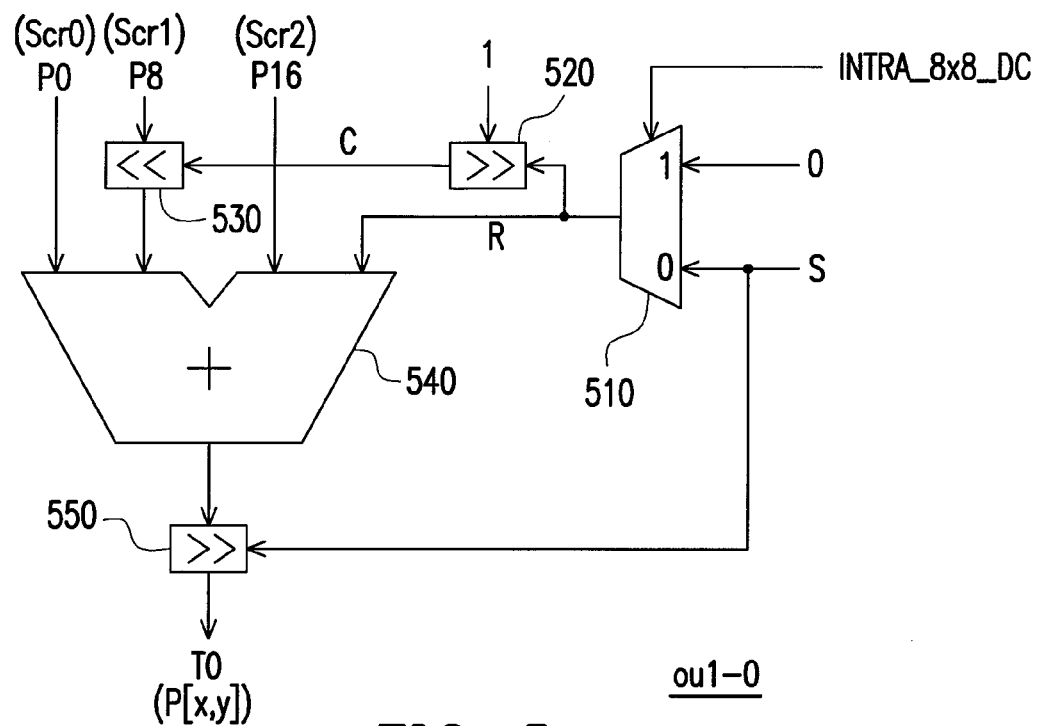

FIG. 5 schematically illustrates an exemplary embodiment of an operation unit OU1-0 according to the invention. The other operation units OU1-1~OU1-7 may have the same structure. The operation unit OU1-0 includes a switcher 510, right shifters 520 and 550, a left shifter 530, and an adder 540. The switcher 510 receives computing signal S. If INTRA_8*8_DC mode of AVS is practiced, and the surrounding pixels of a predicted block are all available, thus the switcher 510 decides the computing signal R is 0; or, the switcher 510 selects the computing signal S as the parameter R. The right shifter 520 is coupled to the switcher 510 for right shifting the parameter R by 1 as the parameter C. The left shifter 530 is coupled to the selection unit 330 and the right shifter 520 for left shifting the pixel Src1 s by C. In the embodiment, the left shifter 530 lift shifts the output P8 of the selection unit 330 by C.

The adder 540 is coupled to the selection unit 330, the switcher 510, and the left shifter 530. The adder 540 sums up the pixels Src0 and Src2, output of the left shifter 530 (i.e., the pixel value Src<<C), and the parameter R from switcher 510. In the embodiment, outputs P0 and P16 of the selection unit 330 are taken as pixels Src0 and Src2.

The right shifter 550 is coupled to the adder 540 for right shifting output of the adder 540 by S digits as the result Tn. In the embodiment, the result labeled as T0. The above-described equation 1~equation 3 can be executed by the circuit of FIG. 5.

In FIG. 2, there is a operation unit OUT2 in the processing unit 340; however it can be omitted if DC mode is not supported. For example, Intra_8×8_DC mode.

Assume at most 8 surrounding pixels are required, result Tn' can be obtained by calculating Tn'=(T0+T1+T2+R')>>S' (i.e., the above-described equation 4) through the control unit 320 and the operation unit OU2. If more than 8 surrounding pixels are required, thus Tn' can be obtained by calculating Tn'=((T0+T1+T2)+(T0'+T1'+T2')+R')>>S' (i.e., the above-described equation 5) through the control unit 320 and the operation unit OU2. In addition, T0, T1, and T2 respectively stand for results of the operation units OU1-0, OU1-1, and OU1-2. T0', T1', T2' respectively represent the next results of the first operation units OU1-0, OU1-1, and OU1-2. The operation unit OU2 may calculate S' and R' of the equation 4 and the equation 5 according to the computing signal S, wherein S'=S+1 (i.e., the above-described equation 6), and R'=1<<S (i.e., the above-described equation 7).

Figure 6:
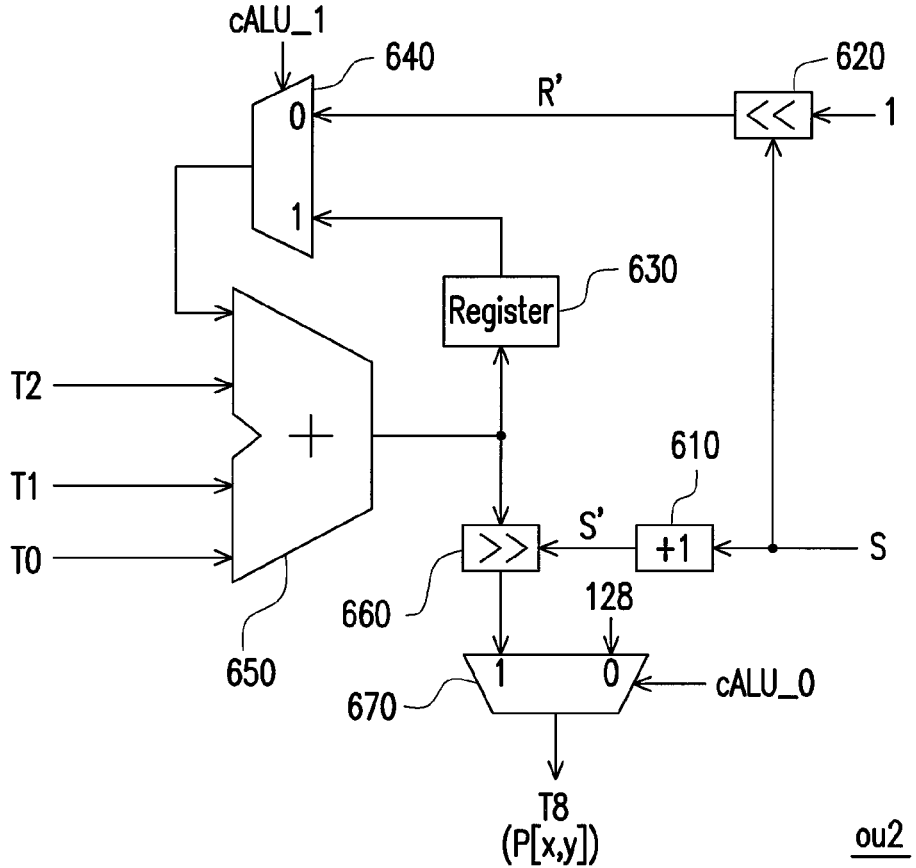
FIG. 6 schematically illustrates an exemplary embodiment of a second computation unit in FIG. 3 according to the present invention.

FIG. 6 schematically illustrates an exemplary embodiment of the operation unit OU2 according to the present invention. The operation unit OU2 includes adders 610 and 650, a left shifter 620, a register 630, switchers 640 and 670, and a right shifter 660. The adder 610 add the computing signal S by 1 as a parameter S'. The left shifter 620 left shifts the value "1" by S digits as a parameter R'. The register 630 temporarily stores the currently summed value output by the adder 650 and provides a previously value to the adder 650. The switcher 640 is coupled to the left shifter 620 and the register 630. The control unit 320 may control the switcher 640 to output the parameter R' by a control signal cALU_1; or output the previously value from the register 630.

The adder 650 sums up the results T0, T1, and T2 output from the operation units OU1-0, OU1-1 and OU1-2 and the output of the switcher 640 as a current value. If the parameter R' is output, the current value is equivalent to (T0+T1+T2+R'). If previously value is selected, thus the currently value is equivalent to ((T0+T1+T2+R')+T0'+T1'+T2').

The right shifter 660 is coupled to the adder 650 and 610 for right shifting the currently value by S' digits. The switcher 670 coupled to the right shifter 660. The control unit 320 may control the switcher 670 to select a value "128" as the result Tn' by a control signal cALU_0; or select output of the right shifter 660 as the result Tn' (labeled as T8 in FIG. 3 and FIG. 6).

The control signals cALU_1 and cALU_0 are determined by the control unit 320. If more than 8 surrounding pixels are required for calculating equation 4, thus the control signal cALU_1=0; the control signal cALU_0 may be determined according what DC mode (LT=0, 1, 2, 3) is. If LT=0, thus cALU_0=0; otherwise, cALU_0=1. If more than 8 surrounding pixels are needed for operating the equation 5, as it has been discussed above, they are two steps to execute the calculation. Therefore, the control signal cALU_1 and cALU_0 respectively have 2 values. In the first calculation, the control signal cALU_1=0, and the control signal cALU_0 is insignificant. In the second calculation, the control signal cALU_0 may be determined according to what DC mode (LT=0, 1, 2, 3) is; if LT=0, then cALU_0=0; otherwise, cALU_0=1

Referring to FIG. 3, the output data unit 350 receives the output selection signals Sout0~Sout7 from the control unit 320. According to the output selection signals Sout0~Sout7, the output data unit 350 may select T0~T8, and output the selected result as the outputs S0, S1, S2, S3, S4, S5, S6, S7 of the intra-frame prediction apparatus 300. The outputs S0~S7 are the predicted values of the 8 pixels in a predicted block. For example, if the output selection signals Sout0~Sout7 are [0, 1, 2, 3, 4, 5, 6, 7], then the output data unit 350 selects the results T0-T7 as the outputs S0~S7 respectively. If the output selection signals Sout0~Sout7 are [8, 8, 8, 8, 8, 8, 8, 8], thus the output data unit 350 selects T8 as S0~S7.

The output data unit 350 may be implemented by any means. For example, 8 of "9-to-1" selectors (or multiplexers) may be utilized to implement the output data unit 350. More detail, each selector is controlled by one of the output selection signals Sout0~Sout7. Each selector outputs one of the results T0~T7 according to its output selection signal.

The input selection signal Sin0~Sin23, the computing signal S, and the output control signal Sout0~Sout7 may be respectively obtained by the control unit 320 from an input selection table, a computing signal table, and an output selection table according to what prediction mode is practiced. Those tables may be built in the control unit 320, or stored in an external memory (not shown).

Take mode 0~mode 8 of 4×4 luminance intra-frame prediction mode of H.264 as an example. Table 2, Table 3, and Table 4 respectively show an input selection table, a computing signal table, and an output selection table of the prediction. Assume only 8 operation units are set in an intra-frame prediction apparatus, it means only 8 pixels can be calculated at one time. Therefore, a 4×4 size prediction block may be divided to an upper half and a lower half. Thus, 16 pixels of the 4×4 size predicted block can be acquired after calculations. In Table 2, Table 3 and Table 4, "0U" and "0L" respectively represent the upper half and the lower half of the predicted block (e.g., the predicted block 110 in FIG. 1) in the mode 0 of the H.264 (i.e., the Intra__4×4_Vertical mode). In addition, "2LT3", "2LT2", and "2LT1" respectively represent the conditions (LT=3, 1, 2 or 0) in the mode 2 of H.264 (i.e., Intra__4×4_DC mode).

TABLE 2

The input selection table of the 4 × 4 luminance prediction mode 0~mode 8 in H.264

| | Selection signals of Src0 | | | | | | | | Selection signals of Src1 | | | | | | | | Selection signals of Src2 | | | | | | | |
|---|---|---|---|---|---|---|---|---|---|---|---|---|---|---|---|---|---|---|---|---|---|---|---|---|
| Mode | Sin 0 | Sin 1 | Sin 2 | Sin 3 | Sin 4 | Sin 5 | Sin 6 | Sin 7 | Sin 8 | Sin 9 | Sin 10 | Sin 11 | Sin 12 | Sin 13 | Sin 14 | Sin 15 | Sin 16 | Sin 17 | Sin 18 | Sin 19 | Sin 20 | Sin 21 | Sin 22 | Sin 23 |
| 0U | 0 | 0 | 0 | 0 | 0 | 0 | 0 | 0 | 3 | 3 | 5 | 4 | 0 | 0 | 0 | 0 | 4 | 5 | 5 | 4 | 0 | 0 | 0 | 0 |
| 0L | 0 | 0 | 0 | 0 | 0 | 0 | 0 | 0 | 3 | 3 | 5 | 4 | 0 | 0 | 0 | 0 | 4 | 5 | 5 | 4 | 0 | 0 | 0 | 0 |
| 1U | 0 | 2 | 0 | 2 | 0 | 0 | 0 | 0 | 0 | 3 | 0 | 4 | 0 | 0 | 0 | 0 | 0 | 5 | 0 | 4 | 0 | 0 | 0 | 0 |
| 1L | 0 | 3 | 0 | 3 | 0 | 0 | 0 | 0 | 0 | 3 | 0 | 4 | 0 | 0 | 0 | 0 | 0 | 5 | 0 | 4 | 0 | 0 | 0 | 0 |
| 2LT3 | 0 | 2 | 0 | 0 | 0 | 0 | 0 | 1 | 1 | 2 | 5 | 0 | 0 | 0 | 0 | 0 | 2 | 0 | 0 | 0 | 0 | 0 | 0 | 0 |
| 2LT2 | 0 | 0 | 0 | 0 | 0 | 0 | 0 | 0 | 3 | 3 | 5 | 0 | 0 | 0 | 0 | 0 | 4 | 0 | 5 | 0 | 0 | 0 | 0 | 0 |
| 2LT1 | 3 | 3 | 5 | 0 | 0 | 0 | 0 | 0 | 3 | 2 | 4 | 0 | 0 | 0 | 0 | 0 | 2 | 5 | 5 | 0 | 0 | 0 | 0 | 0 |
| 3U | 0 | 0 | 1 | 0 | 0 | 0 | 1 | 0 | 0 | 0 | 1 | 0 | 0 | 0 | 2 | 0 | 0 | 0 | 1 | 0 | 0 | 2 | 2 | 0 |
| 3L | 0 | 0 | 1 | 1 | 0 | 0 | 1 | 2 | 0 | 0 | 1 | 0 | 0 | 0 | 2 | 1 | 0 | 0 | 1 | 1 | 0 | 2 | 2 | 1 |
| 4U | 0 | 0 | 2 | 0 | 0 | 0 | 5 | 0 | 2 | 0 | 3 | 0 | 0 | 0 | 0 | 0 | 2 | 0 | 4 | 0 | 0 | 0 | 0 | 0 |
| 4L | 0 | 2 | 2 | 3 | 0 | 0 | 5 | 0 | 2 | 2 | 3 | 1 | 0 | 0 | 0 | 0 | 2 | 2 | 4 | 2 | 0 | 0 | 0 | 0 |
| 5U | 0 | 0 | 0 | 0 | 2 | 4 | 5 | 0 | 0 | 5 | 4 | 5 | 3 | 0 | 4 | 0 | 0 | 0 | 0 | 0 | 0 | 0 | 0 | 0 |
| 5L | 0 | 2 | 0 | 3 | 2 | 4 | 5 | 0 | 1 | 5 | 1 | 5 | 3 | 0 | 4 | 0 | 4 | 0 | 2 | 0 | 0 | 0 | 0 | 0 |
| 6U | 0 | 2 | 2 | 6 | 0 | 0 | 5 | 0 | 1 | 5 | 4 | 0 | 0 | 0 | 3 | 0 | 4 | 2 | 2 | 0 | 0 | 0 | 0 | 2 |
| 6L | 3 | 2 | 0 | 3 | 0 | 2 | 3 | 3 | 3 | 1 | 0 | 1 | 0 | 2 | 5 | 4 | 2 | 4 | 0 | 2 | 0 | 4 | 3 | 3 |
| 7U | 1 | 0 | 0 | 0 | 0 | 0 | 1 | 0 | 3 | 0 | 5 | 4 | 0 | 0 | 2 | 4 | 1 | 0 | 0 | 0 | 0 | 2 | 2 | 0 |
| 7L | 1 | 1 | 0 | 0 | 1 | 0 | 1 | 1 | 3 | 3 | 5 | 4 | 1 | 0 | 2 | 0 | 1 | 1 | 0 | 0 | 1 | 2 | 2 | 0 |
| 8U | 3 | 2 | 0 | 3 | 3 | 0 | 3 | 3 | 3 | 2 | 0 | 1 | 2 | 0 | 5 | 4 | 2 | 2 | 0 | 2 | 2 | 0 | 3 | 3 |
| 8L | 0 | 3 | 0 | 0 | 3 | 0 | 3 | 0 | 0 | 3 | 0 | 0 | 2 | 0 | 5 | 0 | 0 | 5 | 0 | 0 | 2 | 0 | 3 | 0 |

TABLE 3

The computing signal table of the 4 × 4 luminance prediction mode 0~mode 8 in H.264

| | Computing signal S | | | | | | | | |
|---|---|---|---|---|---|---|---|---|---|
| Mode | OU1-0 | OU1-1 | OU1-2 | OU1-3 | OU1-4 | OU1-5 | OU1-6 | OU1-7 | OU2 |
| 0U | 0 | 0 | 0 | 0 | 0 | 0 | 0 | 0 | 0 |
| 0L | 0 | 0 | 0 | 0 | 0 | 0 | 0 | 0 | 0 |
| 1U | 0 | 0 | 0 | 0 | 0 | 0 | 0 | 0 | 0 |
| 1L | 0 | 0 | 0 | 0 | 0 | 0 | 0 | 0 | 0 |
| 2LT3 | 0 | 0 | 0 | 0 | 0 | 0 | 0 | 0 | 2 |
| 2LT2 | 0 | 0 | 0 | 0 | 0 | 0 | 0 | 0 | 1 |
| 2LT1 | 0 | 0 | 0 | 0 | 0 | 0 | 0 | 0 | 1 |
| 3U | 2 | 2 | 2 | 0 | 0 | 2 | 2 | 0 | 0 |
| 3L | 0 | 0 | 2 | 2 | 0 | 2 | 2 | 2 | 0 |
| 4U | 2 | 2 | 2 | 0 | 2 | 0 | 2 | 0 | 0 |
| 4L | 2 | 2 | 2 | 2 | 0 | 0 | 2 | 0 | 0 |
| 5U | 2 | 2 | 1 | 1 | 2 | 1 | 2 | 1 | 0 |
| 5L | 2 | 2 | 1 | 2 | 2 | 1 | 2 | 1 | 0 |
| 6U | 2 | 2 | 1 | 1 | 0 | 0 | 2 | 2 | 0 |
| 6L | 1 | 2 | 0 | 2 | 0 | 2 | 1 | 1 | 0 |
| 7U | 1 | 2 | 1 | 1 | 2 | 2 | 2 | 1 | 0 |
| 7L | 1 | 1 | 1 | 1 | 2 | 2 | 2 | 2 | 0 |

TABLE 3-continued

The computing signal table of the 4 × 4 luminance
prediction mode 0~mode 8 in H.264

| | Computing signal S | | | | | | | |
|---|---|---|---|---|---|---|---|---|
| Mode | OU1-0 | OU1-1 | OU1-2 | OU1-3 | OU1-4 | OU1-5 | OU1-6 | OU1-7 | OU2 |
| 8U | 1 | 2 | 0 | 2 | 2 | 0 | 1 | 1 | 0 |
| 8L | 0 | 0 | 0 | 0 | 2 | 0 | 1 | 0 | 0 |

TABLE 4

The output selection table of the 4 × 4 luminance prediction
mode 0~mode 8 in H.264

| | Output selection signals | | | | | | | |
|---|---|---|---|---|---|---|---|---|
| Mode | Sout0 (S0) | Sout1 (S1) | Sout2 (S2) | Sout3 (S3) | Sout4 (S4) | Sout5 (S5) | Sout6 (S6) | Sout7 (S7) |
| 0U | 0 | 1 | 2 | 3 | 0 | 1 | 2 | 3 |
| 0L | 0 | 1 | 2 | 3 | 0 | 1 | 2 | 3 |
| 1U | 3 | 3 | 3 | 3 | 1 | 1 | 1 | 1 |
| 1L | 3 | 3 | 3 | 3 | 1 | 1 | 1 | 1 |
| 2LT3 | 8 | 8 | 8 | 8 | 8 | 8 | 8 | 8 |
| 2LT2 | 8 | 8 | 8 | 8 | 8 | 8 | 8 | 8 |
| 2LT1 | 8 | 8 | 8 | 8 | 8 | 8 | 8 | 8 |
| 3U | 0 | 1 | 5 | 6 | 1 | 5 | 6 | 2 |
| 3L | 5 | 6 | 2 | 7 | 6 | 2 | 7 | 3 |
| 4U | 0 | 6 | 4 | 1 | 2 | 0 | 6 | 4 |
| 4L | 3 | 2 | 0 | 6 | 1 | 3 | 2 | 0 |
| 5U | 5 | 7 | 2 | 3 | 4 | 6 | 0 | 1 |
| 5L | 1 | 5 | 7 | 2 | 3 | 4 | 6 | 0 |
| 6U | 3 | 7 | 6 | 0 | 2 | 1 | 3 | 7 |
| 6L | 7 | 3 | 0 | 1 | 6 | 5 | 7 | 3 |
| 7U | 7 | 2 | 3 | 0 | 4 | 1 | 5 | 6 |
| 7L | 2 | 3 | 0 | 1 | 7 | 5 | 6 | 4 |
| 8U | 0 | 3 | 7 | 1 | 7 | 1 | 6 | 4 |
| 8L | 6 | 4 | 1 | 1 | 1 | 1 | 1 | 1 |

The following is an example of mode 0 of a 4×4 size in luminance prediction of H.264. As mentioned previously, a formula of the Intra_4×4_Vertical mode is:

$P[x,y]=P[x,-1]$ (wherein x and y are 0~3).

Therefore, please refer to FIG. 1, the upper half of the predicted block 110 are:
P[0,0]=P[0,1]=A=P[0,−1];
P[1,0]=P[1,1]=B=P[1,−1];
P[2,0]=P[2,1]=C=P[2,−1];
P[3,0]=P[3,1]=D=P[3,−1].

According to the two situations—mode 0 and the upper half of the predicted block 110, "0U" in Table 4 is referenced. As a result, the output selection signals Sout0~Sout7 are 0, 1, 2, 3, 0, 1, 2, 3. The control unit 320 provides the values (i.e. Sout0~Sout7 as 0, 1, 2, 3, 0, 1, 2, 3) to the output data unit 350. Therefore, T0~T3 are selected as the output S0~S3 and the output S4~S7 respectively.

P[0,0]=P[0,1]=T0 of the operation unit OU1-0;
P[0,0]=P[1,1]=T1 of the operation unit OU1-1;
P[2,0]=P[2,1]=T2 of the operation unit OU1-2;
P[3,0]=P[3,1]=T3 of the operation unit OU1-3.

Meanwhile, "0U" in Table 2 is also looked up. So the output selection signal Sin0~Sin23 are 0, 0, 0, 0, 0, 0, 0, 0, 3, 3, 5, 4, 0, 0, 0, 0, 4, 5, 5, 4, 0, 0, 0, 0. The surrounding pixel values A, B, C, D are obtained by looking up in Table 1 according to the input selection signals Sin0~Sin23. So the outputs P8~P11 are Z, Z, Z, Z (values of outputs P8~P11 are all "0"), and the outputs P16~P19 are Z, Z, Z, Z.

In addition, "0U" in Table 3 is referenced. So the computing signal S are 0, 0, 0, 0, 0, 0, 0, 0. The formulae, P[x,y]=(Src0+Src1<<C+Src2+R)>>S of OU1-0~OU1-3 are:

$$T0=(A+Z<<0+Z+0)>>0=A;$$

$$T1=(B+Z<<0+Z+0)>>0=B;$$

$$T2=(C+Z<<0+Z+0)>>0=C;$$

$$T3=(D+Z<<0+Z+0)>>0=D.$$

Because the output selection signals Sout0~Sout7 are 0, 1, 2, 3, 0, 1, 2, 3, the outputs S0~S7 are T0, T1, T2, T0, T1, T2, T3. Consequentially, the outputs S0~S7 are A, B, C, D, A, B, C, D. For the upper half of the predicted block 110, the outputs S0~S7 of the output data unit 350 are P[0,0], P[1,0], P[2,0], P[3,0], P[0,1], P[1,1], P[2,1], P[3,1]. It can be observed the prediction pixels gained from the apparatus 300 and tables are identical to the formulae disclosed above.

Another example of the present invention is mode 0 of 8×8 luminance prediction of H.264 (i.e., intra_8×8_Vertical mode). Table 5, Table 6, and Table 7 respectively show its input selection table, computing signal table, and output selection table. For an 8×8 size predicted block (e.g., the predicted block 210 in FIG. 2), the intra-frame prediction apparatus 300 requires 8 steps to obtain the prediction pixels. First of all, please refer to FIG. 2, the predicted block 210 is divided into 8 sub-blocks 000, 001, 010, 011, 100, 101, 110, 111. In the example, the sub-blocks of the predicted block 210 are represented by 3 digits in binary form in Table 5, Table 6, and Table 7. Additionally, the symbol "X" is "don't care"; in other words, "X" can be either "0" or "1". For example, "X0X" represents "000", "001", "100", or "101".

TABLE 5

The input selection table of Intra_8 × 8_Vertical mode of H.264

| | Selection 8 signals of Src0 | | | | | | | | Selection 8 signals of Src1 | | | | | | | | Selection 8 signals of Src2 | | | | | | | |
|---|---|---|---|---|---|---|---|---|---|---|---|---|---|---|---|---|---|---|---|---|---|---|---|---|
| atio | Sin 0 | Sin 1 | Sin 2 | Sin 3 | Sin 4 | Sin 5 | Sin 6 | Sin 7 | Sin 8 | Sin 9 | Sin 10 | Sin 11 | Sin 12 | Sin 13 | Sin 14 | Sin 15 | Sin 16 | Sin 17 | Sin 18 | Sin 19 | Sin 20 | Sin 21 | Sin 22 | Sin 23 |
| X0X | 0 | 0 | 0 | 0 | 0 | 0 | 0 | 0 | 3 | 3 | 5 | 4 | 0 | 0 | 0 | 0 | 4 | 5 | 5 | 4 | 0 | 0 | 0 | 0 |
| X1X | 1 | 1 | 1 | 1 | 0 | 0 | 0 | 0 | 3 | 3 | 5 | 4 | 0 | 0 | 0 | 0 | 4 | 5 | 5 | 4 | 0 | 0 | 0 | 0 |

TABLE 6

The computing signal table of Intra_8 × 8_Vertical mode of computing signal S

| Location | OU1-0 | OU1-1 | OU1-2 | OU1-3 | OU1-4 | OU1-5 | OU1-6 | OU1-7 | OU2 |
|---|---|---|---|---|---|---|---|---|---|
| X0X | 0 | 0 | 0 | 0 | 0 | 0 | 0 | 0 | 0 |
| X1X | 0 | 0 | 0 | 0 | 0 | 0 | 0 | 0 | 0 |

TABLE 7

The output selection table of Intra_8 × 8_Vertical mode of

| Location | Sout0 (S0) | Sout1 (S1) | Sout2 (S2) | Sout3 (S3) | Sout4 (S4) | Sout5 (S5) | Sout6 (S6) | Sout7 (S7) |
|---|---|---|---|---|---|---|---|---|
| X0X | 0 | 1 | 2 | 3 | 0 | 1 | 2 | 3 |
| X1X | 0 | 1 | 2 | 3 | 0 | 1 | 2 | 3 |

Mode 1 of 8×8 luminance prediction of H.264 (i.e., Intra_8×8_Horizontal mode) is taken as an example in the following. Table 8, Table 9, and Table 10 respectively show its input selection table, computing signal table, and output selection table.

TABLE 8

The input selection table of the Intra_8 × 8_Horizontal mode of H.264

| | Selection control signals of Src0 | | | | | | | | Selection control signals of Src1 | | | | | | | | Selection control signals of Src2 | | | | | | | |
|---|---|---|---|---|---|---|---|---|---|---|---|---|---|---|---|---|---|---|---|---|---|---|---|---|
| Location | Sin 0 | Sin 1 | Sin 2 | Sin 3 | Sin 4 | Sin 5 | Sin 6 | Sin 7 | Sin 8 | Sin 9 | Sin 10 | Sin 11 | Sin 12 | Sin 13 | Sin 14 | Sin 15 | Sin 16 | Sin 17 | Sin 18 | Sin 19 | Sin 20 | Sin 21 | Sin 22 | Sin 23 |
| 0X0 | 0 | 2 | 0 | 2 | 0 | 0 | 0 | 0 | 0 | 3 | 0 | 4 | 0 | 0 | 0 | 0 | 5 | 0 | 4 | 0 | 0 | 0 | 0 | 0 |
| 0X1 | 0 | 3 | 0 | 3 | 0 | 0 | 0 | 0 | 0 | 3 | 0 | 4 | 0 | 0 | 0 | 0 | 5 | 0 | 4 | 0 | 0 | 0 | 0 | 0 |
| 1X0 | 4 | 5 | 0 | 0 | 0 | 0 | 0 | 0 | 3 | 3 | 0 | 0 | 0 | 0 | 0 | 0 | 4 | 5 | 0 | 0 | 0 | 0 | 0 | 0 |
| 1X1 | 0 | 0 | 3 | 5 | 0 | 0 | 0 | 0 | 0 | 0 | 5 | 4 | 0 | 0 | 0 | 0 | 0 | 5 | 4 | 0 | 0 | 0 | 0 | 0 |

TABLE 9

The computation parameter table of Intra_8 × 8_Horizontal mode of H.264

| | Computing signal S | | | | | | | | |
|---|---|---|---|---|---|---|---|---|---|
| Location | OU1-0 | OU1-1 | OU1-2 | OU1-3 | OU1-4 | OU1-5 | OU1-6 | OU1-7 | OU2 |
| 0X0 | 0 | 0 | 0 | 0 | 0 | 0 | 0 | 0 | 0 |
| 0X1 | 0 | 0 | 0 | 0 | 0 | 0 | 0 | 0 | 0 |
| 1X0 | 0 | 0 | 0 | 0 | 0 | 0 | 0 | 0 | 0 |
| 1X1 | 0 | 0 | 0 | 0 | 0 | 0 | 0 | 0 | 0 |

TABLE 10

The output selection table of Intra_8 × 8_Horizontal mode of H.264

| | Output selection signals | | | | | | | |
|---|---|---|---|---|---|---|---|---|
| Location | Sout0 (S0) | Sout1 (S1) | Sout2 (S2) | Sout3 (S3) | Sout4 (S4) | Sout5 (S5) | Sout6 (S6) | Sout7 (S7) |
| 0X0 | 3 | 3 | 3 | 3 | 1 | 1 | 1 | 1 |
| 0X1 | 3 | 3 | 3 | 3 | 1 | 1 | 1 | 1 |
| 1X0 | 0 | 0 | 0 | 0 | 1 | 1 | 1 | 1 |
| 1X1 | 2 | 2 | 2 | 2 | 3 | 3 | 3 | 3 |

Mode 2 of 8×8 luminance prediction of H.264 (i.e., Intra_8×8_DC mode) is further taken as an example in the following. Table 11, Table 12, and Table 13 respectively show its input selection table, computing signal table, and output selection table. Wherein, "LT3" means that left surrounding pixels P[−1,y] and top surrounding pixels P[x,−1] are available; "LT2" means that the top surrounding pixels P[x,−1] are available; "LT1" means that the left surrounding pixels P[−1,y] are available.

For LT3 in mode 2 of the 8×8 luminance intra-frame prediction in H.264, it needs two steps to obtain the prediction pixels. The first one is to input control signal of LT2, and then control signal of LT1.

TABLE 11

The input selection table of the 8 × 8 luminance prediction mode 2 in H.264

| | Selection 1 signals of Src0 | | | | | | | | | | Selection signals of Src1 | | | | | | | Selection signals of Src2 | | | | | | |
|---|---|---|---|---|---|---|---|---|---|---|---|---|---|---|---|---|---|---|---|---|---|---|---|---|
| Location | Sin 0 | Sin 1 | Sin 2 | Sin 3 | Sin 4 | Sin 5 | Sin 6 | Sin 7 | Sin 8 | Sin 9 | Sin 10 | Sin 11 | Sin 12 | Sin 13 | Sin 14 | Sin 15 | Sin 16 | Sin 17 | Sin 18 | Sin 19 | Sin 20 | Sin 21 | Sin 22 | Sin 23 |
| LT2 | 0 | 1 | 1 | 0 | 0 | 0 | 0 | 0 | 0 | 0 | 2 | 0 | 0 | 0 | 0 | 0 | 1 | 1 | 5 | 0 | 0 | 0 | 0 | 0 |
| LT1 | 4 | 5 | 3 | 0 | 0 | 0 | 0 | 0 | 3 | 1 | 4 | 0 | 0 | 0 | 0 | 0 | 3 | 2 | 3 | 0 | 0 | 0 | 0 | 0 |

TABLE 12

The computing signal table of the 8 × 8 luminance prediction mode 2 in H.264

| | Computing signal S | | | | | | | | |
|---|---|---|---|---|---|---|---|---|---|
| Location | OU1-0 | OU1-1 | OU1-2 | OU1-3 | OU1-4 | OU1-5 | OU1-6 | OU1-7 | OU2 |
| LT3 | 0 | 0 | 0 | 0 | 0 | 0 | 0 | 0 | 3 |
| LT2, LT1 | 0 | 0 | 0 | 0 | 0 | 0 | 0 | 0 | 2 |

TABLE 13

The output selection table of the 8 × 8 luminance prediction mode 2 in H.264

| | Output selection signals | | | | | | | |
|---|---|---|---|---|---|---|---|---|
| Location | Sout0 (S0) | Sout1 (S1) | Sout2 (S2) | Sout3 (S3) | Sout4 (S4) | Sout5 (S5) | Sout6 (S6) | Sout7 (S7) |
| LT2 | 8 | 8 | 8 | 8 | 8 | 8 | 8 | 8 |
| LT1 | 8 | 8 | 8 | 8 | 8 | 8 | 8 | 8 |

Mode 3 of 8×8 luminance prediction of H.264 (i.e., Intra_8×8_Diagonal_Down_Left mode) is further taken as an example in the following. Table 14, Table 15, and Table 16 respectively show its input selection table, computing signal table, and output selection table.

TABLE 14

The input selection table of Intra_8 × 8_Diagonal_Down_Left mode of H.264

| | Selection 1 signals of Src0 | | | | | | | | | | Selection signals of Src1 | | | | | | | Selection signals of Src2 | | | | | | |
|---|---|---|---|---|---|---|---|---|---|---|---|---|---|---|---|---|---|---|---|---|---|---|---|---|
| Location | Sin 0 | Sin 1 | Sin 2 | Sin 3 | Sin 4 | Sin 5 | Sin 6 | Sin 7 | Sin 8 | Sin 9 | Sin 10 | Sin 11 | Sin 12 | Sin 13 | Sin 14 | Sin 15 | Sin 16 | Sin 17 | Sin 18 | Sin 19 | Sin 20 | Sin 21 | Sin 22 | Sin 23 |
| 000 | 0 | 0 | 1 | 0 | 0 | 0 | 1 | 0 | 0 | 0 | 1 | 0 | 0 | 0 | 2 | 0 | 0 | 0 | 1 | 0 | 0 | 2 | 2 | 0 |
| 001 | 0 | 0 | 1 | 0 | 1 | 0 | 1 | 2 | 0 | 0 | 2 | 0 | 1 | 0 | 2 | 1 | 0 | 0 | 6 | 0 | 1 | 2 | 2 | 1 |
| 010 | 0 | 0 | 1 | 1 | 1 | 5 | 0 | 2 | 0 | 0 | 2 | 5 | 1 | 4 | 0 | 1 | 0 | 0 | 6 | 5 | 1 | 6 | 0 | 1 |
| 011 | 0 | 0 | 1 | 1 | 6 | 5 | 0 | 6 | 0 | 0 | 2 | 5 | 7 | 4 | 0 | 5 | 0 | 0 | 6 | 5 | 6 | 6 | 0 | 5 |
| 100 | 0 | 0 | 1 | 1 | 1 | 5 | 0 | 2 | 0 | 0 | 2 | 5 | 1 | 4 | 0 | 1 | 0 | 0 | 6 | 5 | 1 | 6 | 0 | 1 |
| 101 | 0 | 0 | 1 | 1 | 6 | 5 | 0 | 6 | 0 | 0 | 2 | 5 | 7 | 4 | 0 | 5 | 0 | 0 | 6 | 5 | 6 | 6 | 0 | 5 |
| 110 | 6 | 0 | 4 | 0 | 6 | 0 | 7 | 6 | 5 | 0 | 6 | 0 | 6 | 0 | 6 | 5 | 7 | 0 | 7 | 0 | 5 | 0 | 6 | 5 |
| 111 | 6 | 0 | 0 | 0 | 6 | 6 | 7 | 7 | 5 | 0 | 0 | 0 | 7 | 5 | 6 | 6 | 7 | 0 | 0 | 0 | 6 | 7 | 6 | 6 |

TABLE 15

The computing signal table of Intra_8 × 8_Diagonal_Down_Left mode of H.264

| | Computing signal S | | | | | | | | |
|---|---|---|---|---|---|---|---|---|---|
| Location | OU1-0 | OU1-1 | OU1-2 | OU1-3 | OU1-4 | OU1-5 | OU1-6 | OU1-7 | OU2 |
| 000 | 0 | 2 | 2 | 0 | 2 | 2 | 2 | 0 | 0 |
| 001 | 0 | 0 | 2 | 0 | 2 | 2 | 2 | 2 | 0 |

TABLE 15-continued

The computing signal table of Intra_8 × 8_Diagonal_Down_Left mode of H.264

| Location | OU1-0 | OU1-1 | OU1-2 | OU1-3 | OU1-4 | OU1-5 | OU1-6 | OU1-7 | OU2 |
|---|---|---|---|---|---|---|---|---|---|
| 010 | 0 | 0 | 2 | 2 | 2 | 2 | 0 | 2 | 0 |
| 011 | 0 | 0 | 2 | 2 | 2 | 2 | 0 | 2 | 0 |
| 100 | 0 | 0 | 2 | 2 | 2 | 2 | 0 | 2 | 0 |
| 101 | 0 | 0 | 2 | 2 | 2 | 2 | 0 | 2 | 0 |
| 110 | 2 | 0 | 2 | 0 | 2 | 0 | 2 | 2 | 0 |
| 111 | 2 | 0 | 0 | 0 | 2 | 2 | 2 | 2 | 0 |

TABLE 16

The output selection control table of Intra_8 × 8_Diagonal_Down_Left mode of H.264

| Location | Sout0 (S0) | Sout1 (S1) | Sout2 (S2) | Sout3 (S3) | Sout4 (S4) | Sout5 (S5) | Sout6 (S6) | Sout7 (S7) |
|---|---|---|---|---|---|---|---|---|
| 000 | 4 | 1 | 5 | 6 | 1 | 5 | 6 | 2 |
| 001 | 5 | 6 | 4 | 7 | 6 | 4 | 7 | 2 |
| 010 | 4 | 7 | 2 | 3 | 7 | 2 | 3 | 5 |
| 011 | 2 | 3 | 5 | 7 | 3 | 5 | 7 | 4 |
| 100 | 4 | 7 | 2 | 3 | 7 | 2 | 3 | 5 |
| 101 | 2 | 3 | 5 | 7 | 3 | 5 | 7 | 4 |
| 110 | 4 | 7 | 2 | 0 | 7 | 2 | 0 | 6 |
| 111 | 4 | 0 | 6 | 7 | 0 | 6 | 7 | 5 |

Mode 4 of 8×8 luminance prediction of H.264 (i.e., Intra_8×8_Diagonal_Down_Right mode) is further taken as an example in the following. Table 17, Table 18, and Table 19 respectively show its input selection table, computing signal table, and output selection table.

TABLE 17

The input selection table of Intra_8 × 8_Diagonal_Down_Right mode of H.264

| Location | Selection signals of Src0 | | | | | | | | Selection signals of Src1 | | | | | | | | Selection signals of Src2 | | | | | | | |
|---|---|---|---|---|---|---|---|---|---|---|---|---|---|---|---|---|---|---|---|---|---|---|---|---|
| | Sin 0 | Sin 1 | Sin 2 | Sin 3 | Sin 4 | Sin 5 | Sin 6 | Sin 7 | Sin 8 | Sin 9 | Sin 10 | Sin 11 | Sin 12 | Sin 13 | Sin 14 | Sin 15 | Sin 16 | Sin 17 | Sin 18 | Sin 19 | Sin 20 | Sin 21 | Sin 22 | Sin 23 |
| 000 | 0 | 0 | 2 | 0 | 2 | 0 | 5 | 0 | 0 | 0 | 3 | 0 | 5 | 0 | 0 | 0 | 0 | 0 | 4 | 0 | 0 | 0 | 0 | 0 |
| 001 | 0 | 2 | 2 | 3 | 2 | 0 | 5 | 0 | 0 | 2 | 3 | 1 | 5 | 0 | 0 | 0 | 0 | 2 | 4 | 2 | 0 | 0 | 0 | 0 |
| 010 | 0 | 0 | 0 | 0 | 1 | 0 | 1 | 2 | 0 | 0 | 0 | 0 | 1 | 0 | 2 | 1 | 0 | 0 | 0 | 0 | 1 | 2 | 2 | 1 |
| 011 | 0 | 0 | 0 | 0 | 0 | 1 | 2 | 0 | 0 | 0 | 0 | 0 | 1 | 0 | 0 | 0 | 0 | 1 | 0 | 0 | 1 | 0 | 0 | 0 |
| 100 | 4 | 2 | 0 | 3 | 0 | 2 | 4 | 0 | 1 | 1 | 0 | 1 | 0 | 2 | 4 | 0 | 3 | 4 | 0 | 2 | 0 | 4 | 3 | 0 |
| 101 | 4 | 2 | 0 | 5 | 0 | 0 | 4 | 5 | 1 | 2 | 0 | 3 | 0 | 0 | 4 | 2 | 3 | 2 | 0 | 3 | 0 | 0 | 3 | 4 |
| 110 | 0 | 0 | 2 | 0 | 2 | 0 | 5 | 0 | 0 | 0 | 3 | 0 | 5 | 0 | 0 | 0 | 0 | 0 | 4 | 0 | 0 | 0 | 0 | 0 |
| 111 | 0 | 2 | 2 | 3 | 2 | 0 | 5 | 0 | 0 | 2 | 3 | 1 | 5 | 0 | 0 | 0 | 0 | 2 | 4 | 2 | 0 | 0 | 0 | 0 |

TABLE 18

The computing signal table of Intra_8 × 8_Diagonal_Down_Right mode of H.264

| Location | OU1-0 | OU1-1 | OU1-2 | OU1-3 | OU1-4 | OU1-5 | OU1-6 | OU1-7 | OU2 |
|---|---|---|---|---|---|---|---|---|---|
| 000 | 2 | 2 | 2 | 0 | 2 | 0 | 2 | 0 | 0 |
| 001 | 0 | 2 | 2 | 2 | 2 | 0 | 2 | 0 | 0 |
| 010 | 0 | 2 | 0 | 0 | 2 | 2 | 2 | 2 | 0 |
| 011 | 0 | 2 | 2 | 0 | 2 | 2 | 2 | 0 | 0 |
| 100 | 2 | 2 | 0 | 2 | 0 | 2 | 2 | 0 | 0 |
| 101 | 2 | 2 | 0 | 2 | 0 | 0 | 2 | 2 | 0 |
| 110 | 2 | 2 | 2 | 0 | 2 | 0 | 2 | 0 | 0 |
| 111 | 0 | 2 | 2 | 2 | 2 | 0 | 2 | 0 | 0 |

TABLE 19

The output selection table of Intra_8 × 8_Diagonal_Down_Right mode of H.264

| Location | Output selection signals | | | | | | | |
|---|---|---|---|---|---|---|---|---|
| | Sout0 (S0) | Sout1 (S1) | Sout2 (S2) | Sout3 (S3) | Sout4 (S4) | Sout5 (S5) | Sout6 (S6) | Sout7 (S7) |
| 000 | 4 | 6 | 0 | 1 | 2 | 4 | 6 | 0 |
| 001 | 3 | 2 | 4 | 6 | 1 | 3 | 2 | 4 |
| 010 | 5 | 6 | 4 | 7 | 1 | 5 | 6 | 4 |
| 011 | 4 | 1 | 2 | 5 | 6 | 4 | 1 | 2 |
| 100 | 0 | 5 | 3 | 1 | 6 | 0 | 5 | 3 |
| 101 | 7 | 6 | 0 | 1 | 3 | 7 | 6 | 0 |
| 110 | 4 | 6 | 0 | 1 | 2 | 4 | 6 | 0 |
| 111 | 3 | 2 | 4 | 6 | 1 | 3 | 2 | 4 |

TABLE 22

The output selection table of Intra_8 × 8_Vertical_Right mode of H.264

| Location | Output selection signals | | | | | | | |
|---|---|---|---|---|---|---|---|---|
| | Sout0 (S0) | Sout1 (S1) | Sout2 (S2) | Sout3 (S3) | Sout4 (S4) | Sout5 (S5) | Sout6 (S6) | Sout7 (S7) |
| 000 | 5 | 7 | 2 | 3 | 4 | 6 | 0 | 1 |
| 001 | 1 | 5 | 7 | 2 | 3 | 4 | 6 | 0 |
| 010 | 0 | 1 | 6 | 3 | 2 | 5 | 4 | 7 |
| 011 | 3 | 0 | 1 | 6 | 7 | 2 | 5 | 4 |
| 100 | 1 | 2 | 5 | 7 | 0 | 3 | 4 | 6 |
| 101 | 6 | 1 | 2 | 5 | 7 | 0 | 3 | 4 |
| 110 | 2 | 3 | 0 | 1 | 4 | 7 | 6 | 5 |
| 111 | 7 | 2 | 3 | 0 | 6 | 4 | 1 | 5 |

Mode 5 of 8×8 luminance prediction of H.264 (i.e., Intra_8×8_Vertical_Right mode) is further taken as an example in the following. Table 20, Table 21, and Table respectively show its input selection table, computing signal table, and output selection table.

Mode 6 of 8×8 luminance prediction of H.264 (i.e., Intra_8×8_Horizontal_Down mode) is further taken as an example in the following. Table 23, Table 24, and Table respectively show its input selection table, computing signal table, and output selection table.

TABLE 20

The input selection table of Intra_8 × 8_Vertical_Right mode of H.264

| Location | Selection signals of Src0 | | | | | | | | Selection signals of Src1 | | | | | | | | Selection signals of Src2 | | | | | | | |
|---|---|---|---|---|---|---|---|---|---|---|---|---|---|---|---|---|---|---|---|---|---|---|---|---|
| | Sin 0 | Sin 1 | Sin 2 | Sin 3 | Sin 4 | Sin 5 | Sin 6 | Sin 7 | Sin 8 | Sin 9 | Sin 10 | Sin 11 | Sin 12 | Sin 13 | Sin 14 | Sin 15 | Sin 16 | Sin 17 | Sin 18 | Sin 19 | Sin 20 | Sin 21 | Sin 22 | Sin 23 |
| 000 | 0 | 0 | 0 | 0 | 2 | 4 | 5 | 0 | 0 | 0 | 5 | 4 | 5 | 3 | 0 | 4 | 0 | 0 | 0 | 0 | 0 | 0 | 0 | 0 |
| 001 | 0 | 2 | 0 | 3 | 2 | 4 | 5 | 0 | 0 | 1 | 5 | 1 | 5 | 3 | 0 | 4 | 0 | 4 | 0 | 2 | 0 | 0 | 0 | 0 |
| 010 | 1 | 1 | 0 | 1 | 1 | 1 | 2 | 2 | 3 | 3 | 0 | 4 | 1 | 1 | 5 | 1 | 1 | 1 | 1 | 1 | 1 | 1 | 2 | 1 |
| 011 | 1 | 1 | 0 | 0 | 1 | 1 | 2 | 1 | 3 | 3 | 0 | 4 | 1 | 1 | 5 | 0 | 1 | 1 | 1 | 0 | 1 | 1 | 2 | 0 |
| 100 | 4 | 2 | 2 | 3 | 2 | 4 | 5 | 0 | 1 | 2 | 3 | 1 | 5 | 3 | 0 | 4 | 3 | 2 | 4 | 2 | 0 | 0 | 0 | 0 |
| 101 | 4 | 2 | 2 | 3 | 2 | 4 | 4 | 5 | 1 | 2 | 3 | 1 | 5 | 3 | 4 | 2 | 3 | 2 | 4 | 2 | 0 | 0 | 3 | 4 |
| 110 | 1 | 1 | 0 | 0 | 0 | 1 | 0 | 1 | 3 | 3 | 5 | 4 | 0 | 1 | 1 | 0 | 1 | 1 | 0 | 0 | 0 | 1 | 1 | 0 |
| 111 | 1 | 0 | 0 | 0 | 0 | 0 | 5 | 0 | 3 | 0 | 5 | 4 | 0 | 0 | 0 | 4 | 1 | 0 | 0 | 0 | 0 | 2 | 0 | 0 |

TABLE 21

The computing signal table of Intra_8 × 8_Vertical_Right mode of H.264

| Location | Computing signal S | | | | | | | | |
|---|---|---|---|---|---|---|---|---|---|
| | OU1-0 | OU1-1 | OU1-2 | OU1-3 | OU1-4 | OU1-5 | OU1-6 | OU1-7 | OU2 |
| 000 | 2 | 2 | 1 | 1 | 2 | 1 | 2 | 1 | 0 |
| 001 | 2 | 2 | 1 | 2 | 2 | 1 | 2 | 1 | 0 |
| 010 | 1 | 1 | 2 | 1 | 2 | 2 | 1 | 2 | 0 |
| 011 | 1 | 1 | 2 | 1 | 2 | 2 | 1 | 2 | 0 |
| 100 | 2 | 2 | 2 | 2 | 2 | 1 | 2 | 1 | 0 |
| 101 | 2 | 2 | 2 | 2 | 2 | 1 | 2 | 2 | 0 |
| 110 | 1 | 1 | 1 | 1 | 2 | 2 | 2 | 2 | 0 |
| 111 | 1 | 2 | 1 | 1 | 2 | 2 | 2 | 1 | 0 |

TABLE 23

The input selection table of Intra_8 × 8_Horizontal_Down mode of H.264

| Location | Selection signals of Src0 | | | | | | | | Selection signals of Src1 | | | | | | | | Selection signals of Src2 | | | | | | | |
|---|---|---|---|---|---|---|---|---|---|---|---|---|---|---|---|---|---|---|---|---|---|---|---|---|
| | Sin 0 | Sin 1 | Sin 2 | Sin 3 | Sin 4 | Sin 5 | Sin 6 | Sin 7 | Sin 8 | Sin 9 | Sin 10 | Sin 11 | Sin 12 | Sin 13 | Sin 14 | Sin 15 | Sin 16 | Sin 17 | Sin 18 | Sin 19 | Sin 20 | Sin 21 | Sin 22 | Sin 23 |
| 000 | 0 | 2 | 2 | 6 | 0 | 0 | 5 | 0 | 2 | 1 | 5 | 4 | 0 | 0 | 0 | 0 | 2 | 4 | 2 | 2 | 0 | 0 | 0 | 0 |
| 001 | 3 | 2 | 2 | 3 | 0 | 2 | 3 | 0 | 3 | 1 | 5 | 1 | 0 | 2 | 5 | 0 | 3 | 4 | 2 | 2 | 0 | 4 | 3 | 0 |
| 010 | 0 | 0 | 0 | 0 | 1 | 1 | 5 | 0 | 0 | 0 | 0 | 0 | 1 | 1 | 0 | 0 | 0 | 0 | 1 | 0 | 1 | 1 | 0 | 0 |
| 011 | 3 | 2 | 0 | 6 | 0 | 0 | 5 | 0 | 3 | 1 | 0 | 4 | 0 | 0 | 0 | 3 | 2 | 4 | 0 | 2 | 0 | 0 | 0 | 2 |
| 100 | 4 | 2 | 0 | 4 | 0 | 3 | 3 | 4 | 1 | 2 | 0 | 2 | 0 | 3 | 5 | 4 | 3 | 2 | 0 | 3 | 0 | 5 | 3 | 4 |
| 101 | 0 | 5 | 3 | 4 | 4 | 3 | 0 | 5 | 0 | 3 | 5 | 2 | 3 | 3 | 0 | 2 | 0 | 3 | 3 | 3 | 4 | 5 | 0 | 4 |
| 110 | 3 | 2 | 0 | 3 | 0 | 2 | 3 | 3 | 3 | 1 | 0 | 1 | 0 | 2 | 5 | 4 | 2 | 4 | 0 | 2 | 0 | 4 | 3 | 3 |
| 111 | 4 | 2 | 0 | 4 | 0 | 3 | 3 | 4 | 1 | 2 | 0 | 2 | 0 | 3 | 5 | 4 | 3 | 2 | 0 | 3 | 0 | 5 | 3 | 4 |

TABLE 24

The computing signal table of Intra_8 × 8_Horizontal_Down mode of H.264

| Location | Computing signal S | | | | | | | | |
|---|---|---|---|---|---|---|---|---|---|
| | OU1-0 | OU1-1 | OU1-2 | OU1-3 | OU1-4 | OU1-5 | OU1-6 | OU1-7 | OU2 |
| 000 | 2 | 2 | 1 | 1 | 2 | 0 | 2 | 0 | 0 |
| 001 | 1 | 2 | 1 | 2 | 0 | 2 | 1 | 0 | 0 |
| 010 | 2 | 2 | 2 | 0 | 2 | 2 | 2 | 0 | 0 |
| 011 | 1 | 2 | 0 | 1 | 2 | 0 | 2 | 2 | 0 |
| 100 | 2 | 2 | 0 | 2 | 0 | 1 | 1 | 1 | 0 |
| 101 | 0 | 1 | 1 | 2 | 2 | 1 | 0 | 2 | 0 |
| 110 | 1 | 2 | 0 | 2 | 0 | 2 | 1 | 1 | 0 |
| 111 | 2 | 2 | 0 | 2 | 0 | 1 | 1 | 1 | 0 |

TABLE 25

The output selection table of Intra_8 × 8_Horizontal_Down mode H.264

| Location | Output selection signals | | | | | | | |
|---|---|---|---|---|---|---|---|---|
| | Sout0 (S0) | Sout1 (S1) | Sout2 (S2) | Sout3 (S3) | Sout4 (S4) | Sout5 (S5) | Sout6 (S6) | Sout7 (S7) |
| 000 | 3 | 0 | 6 | 4 | 2 | 1 | 3 | 0 |
| 001 | 0 | 3 | 2 | 1 | 6 | 5 | 0 | 3 |
| 010 | 1 | 2 | 5 | 4 | 6 | 0 | 1 | 2 |
| 011 | 3 | 7 | 6 | 4 | 0 | 1 | 3 | 7 |
| 100 | 7 | 0 | 6 | 1 | 5 | 3 | 7 | 0 |
| 101 | 1 | 7 | 5 | 3 | 2 | 4 | 1 | 7 |
| 110 | 7 | 3 | 0 | 1 | 6 | 5 | 7 | 3 |
| 111 | 7 | 0 | 6 | 1 | 5 | 3 | 7 | 0 |

Mode 7 of 8×8 luminance prediction of H.264 (i.e., Intra__8×8_Vertical_Left mode) is further taken as an example in the following. Table 26, Table 27, and Table respectively show its input selection table, computing signal table, and output selection table.

TABLE 26

The input selection table of Intra_8 × 8_Vertical_Left mode of H.264

| Location | Selection signals of Src0 | | | | | | | | Selection signals of Src1 | | | | | | | | Selection signals of Src2 | | | | | | | |
|---|---|---|---|---|---|---|---|---|---|---|---|---|---|---|---|---|---|---|---|---|---|---|---|---|
| | Sin 0 | Sin 1 | Sin 2 | Sin 3 | Sin 4 | Sin 5 | Sin 6 | Sin 7 | Sin 8 | Sin 9 | Sin 10 | Sin 11 | Sin 12 | Sin 13 | Sin 14 | Sin 15 | Sin 16 | Sin 17 | Sin 18 | Sin 19 | Sin 20 | Sin 21 | Sin 22 | Sin 23 |
| 000 | 1 | 0 | 0 | 0 | 0 | 1 | 0 | 0 | 3 | 0 | 5 | 4 | 0 | 1 | 1 | 4 | 1 | 0 | 0 | 0 | 0 | 1 | 1 | 0 |
| 001 | 1 | 1 | 0 | 0 | 1 | 0 | 1 | 1 | 3 | 3 | 5 | 4 | 1 | 0 | 2 | 0 | 1 | 1 | 0 | 0 | 1 | 2 | 2 | 0 |
| 010 | 2 | 1 | 1 | 1 | 1 | 5 | 2 | 2 | 4 | 3 | 2 | 4 | 1 | 3 | 5 | 1 | 5 | 1 | 6 | 1 | 1 | 3 | 2 | 1 |
| 011 | 2 | 6 | 1 | 1 | 6 | 5 | 2 | 2 | 4 | 3 | 2 | 4 | 6 | 3 | 5 | 1 | 5 | 6 | 6 | 1 | 5 | 3 | 2 | 1 |
| 100 | 1 | 1 | 0 | 0 | 1 | 1 | 2 | 2 | 3 | 3 | 0 | 4 | 1 | 1 | 5 | 1 | 1 | 1 | 1 | 0 | 1 | 1 | 2 | 1 |
| 101 | 1 | 1 | 1 | 1 | 1 | 1 | 2 | 2 | 3 | 3 | 2 | 4 | 1 | 1 | 5 | 1 | 1 | 1 | 6 | 1 | 1 | 1 | 2 | 1 |
| 110 | 2 | 6 | 1 | 1 | 6 | 5 | 6 | 6 | 4 | 3 | 2 | 4 | 6 | 3 | 5 | 5 | 5 | 6 | 6 | 1 | 5 | 3 | 5 | 5 |
| 111 | 5 | 6 | 4 | 1 | 6 | 5 | 6 | 6 | 3 | 3 | 6 | 5 | 6 | 3 | 5 | 5 | 6 | 6 | 7 | 5 | 5 | 3 | 5 | 5 |

TABLE 27

The computing signal table of Intra_8 × 8_Vertical_Left mode of H.264

| | Computing signal S | | | | | | | |
|---|---|---|---|---|---|---|---|---|
| Location | OU1-0 | OU1-1 | OU1-2 | OU1-3 | OU1-4 | OU1-5 | OU1-6 | OU1-7 | OU2 |
| 000 | 1 | 2 | 1 | 1 | 2 | 2 | 2 | 1 | 0 |
| 001 | 1 | 1 | 1 | 1 | 2 | 2 | 2 | 2 | 0 |
| 010 | 2 | 1 | 2 | 1 | 2 | 1 | 1 | 2 | 0 |
| 011 | 2 | 1 | 2 | 1 | 2 | 1 | 1 | 2 | 0 |
| 100 | 1 | 1 | 2 | 1 | 2 | 2 | 1 | 2 | 0 |
| 101 | 1 | 1 | 2 | 1 | 2 | 2 | 1 | 2 | 0 |
| 110 | 2 | 1 | 2 | 1 | 2 | 1 | 1 | 2 | 0 |
| 111 | 1 | 1 | 2 | 2 | 2 | 1 | 1 | 2 | 0 |

TABLE 28

The output selection table of Intra_8 × 8_Vertical_Left mode of H.264

| | Output selection signals | | | | | | | |
|---|---|---|---|---|---|---|---|---|
| Location | Sout0 (S0) | Sout1 (S1) | Sout2 (S2) | Sout3 (S3) | Sout4 (S4) | Sout5 (S5) | Sout6 (S6) | Sout7 (S7) |
| 000 | 7 | 2 | 3 | 0 | 4 | 1 | 6 | 5 |
| 001 | 2 | 3 | 0 | 1 | 7 | 5 | 6 | 4 |
| 010 | 1 | 6 | 3 | 5 | 4 | 7 | 2 | 0 |
| 011 | 6 | 3 | 5 | 1 | 7 | 2 | 0 | 4 |
| 100 | 3 | 0 | 1 | 6 | 2 | 5 | 4 | 7 |
| 101 | 0 | 1 | 6 | 3 | 5 | 4 | 7 | 2 |
| 110 | 3 | 5 | 1 | 6 | 2 | 0 | 4 | 7 |
| 111 | 5 | 1 | 6 | 0 | 3 | 4 | 7 | 2 |

Mode 8 of 8×8 luminance prediction of H.264 (i.e., Intra_8×8_Horizontal_Up mode) is further taken as an example in the following. Table 29, Table 30, and Table respectively show its input selection table, computing signal table, and output selection table.

TABLE 29

The input selection table of Intra_8 × 8_Horizontal_Up mode of H.264

| | Selection signals of Src0 | | | | | | | | Selection signals of Src1 | | | | | | | | Selection signals of Src2 | | | | | | | |
|---|---|---|---|---|---|---|---|---|---|---|---|---|---|---|---|---|---|---|---|---|---|---|---|---|
| Location | Sin 0 | Sin 1 | Sin 2 | Sin 3 | Sin 4 | Sin 5 | Sin 6 | Sin 7 | Sin 8 | Sin 9 | Sin 10 | Sin 11 | Sin 12 | Sin 13 | Sin 14 | Sin 15 | Sin 16 | Sin 17 | Sin 18 | Sin 19 | Sin 20 | Sin 21 | Sin 22 | Sin 23 |
| 000 | 3 | 2 | 0 | 3 | 3 | 0 | 3 | 3 | 3 | 2 | 0 | 1 | 2 | 0 | 5 | 4 | 2 | 2 | 0 | 2 | 3 | 0 | 3 | 3 |
| 001 | 4 | 4 | 0 | 4 | 0 | 3 | 3 | 5 | 1 | 3 | 0 | 2 | 0 | 3 | 5 | 2 | 3 | 2 | 0 | 3 | 0 | 5 | 3 | 4 |
| 010 | 4 | 4 | 0 | 4 | 0 | 3 | 3 | 5 | 1 | 3 | 0 | 2 | 0 | 3 | 5 | 2 | 3 | 2 | 0 | 3 | 0 | 5 | 3 | 4 |
| 011 | 0 | 5 | 3 | 5 | 5 | 3 | 0 | 5 | 0 | 3 | 5 | 3 | 4 | 3 | 0 | 2 | 0 | 3 | 3 | 3 | 4 | 5 | 0 | 4 |
| 100 | 0 | 5 | 3 | 5 | 5 | 3 | 0 | 5 | 0 | 3 | 5 | 3 | 4 | 3 | 0 | 2 | 0 | 3 | 3 | 3 | 4 | 5 | 0 | 4 |
| 101 | 0 | 0 | 3 | 5 | 5 | 0 | 0 | 0 | 0 | 5 | 4 | 4 | 0 | 0 | 0 | 0 | 3 | 4 | 4 | 0 | 0 | 0 |
| 110 | 0 | 0 | 3 | 5 | 5 | 0 | 0 | 0 | 0 | 5 | 4 | 4 | 0 | 0 | 0 | 0 | 3 | 4 | 4 | 0 | 0 | 0 |
| 111 | 0 | 0 | 0 | 5 | 0 | 0 | 0 | 0 | 0 | 0 | 4 | 0 | 0 | 0 | 0 | 0 | 4 | 0 | 0 | 0 | 0 |

TABLE 30

The computing signal table of Intra_8 × 8_Horizontal_Up mode of H.264

| | Computing signal S | | | | | | | |
|---|---|---|---|---|---|---|---|---|
| Location | OU1-0 | OU1-1 | OU1-2 | OU1-3 | OU1-4 | OU1-5 | OU1-6 | OU1-7 | OU2 |
| 000 | 1 | 2 | 0 | 2 | 2 | 0 | 1 | 1 | 0 |
| 001 | 2 | 1 | 0 | 2 | 0 | 1 | 1 | 2 | 0 |
| 010 | 2 | 1 | 0 | 2 | 0 | 1 | 1 | 2 | 0 |
| 011 | 0 | 1 | 1 | 2 | 2 | 1 | 0 | 2 | 0 |
| 100 | 0 | 1 | 1 | 2 | 2 | 1 | 0 | 2 | 0 |
| 101 | 0 | 0 | 1 | 0 | 2 | 0 | 0 | 0 | 0 |
| 110 | 0 | 0 | 1 | 0 | 2 | 0 | 0 | 0 | 0 |
| 111 | 0 | 0 | 0 | 0 | 0 | 0 | 0 | 0 | 0 |

TABLE 31

The output selection table of Intra_8 × 8_Horizontal_Up mode of H.264

| Location | Output selection signals | | | | | | | |
|---|---|---|---|---|---|---|---|---|
| | Sout0 (S0) | Sout1 (S1) | Sout2 (S2) | Sout3 (S3) | Sout4 (S4) | Sout5 (S5) | Sout6 (S6) | Sout7 (S7) |
| 000 | 0 | 3 | 7 | 1 | 7 | 1 | 6 | 4 |
| 001 | 6 | 0 | 1 | 3 | 1 | 3 | 5 | 7 |
| 010 | 6 | 0 | 1 | 3 | 1 | 3 | 5 | 7 |
| 011 | 5 | 7 | 1 | 3 | 1 | 3 | 2 | 4 |
| 100 | 5 | 7 | 1 | 3 | 1 | 3 | 2 | 4 |
| 101 | 2 | 4 | 3 | 3 | 3 | 3 | 3 | 3 |
| 110 | 2 | 4 | 3 | 3 | 3 | 3 | 3 | 3 |
| 111 | 3 | 3 | 3 | 3 | 3 | 3 | 3 | 3 |

Mode 0 of 8×8 luminance prediction of H.264 (i.e., Intra_Chroma_DC mode) is further taken as an example in the following. Table 32, Table 33, and Table respectively show its input selection table, computing signal table, and output selection table. In addition, "Q" represents which 4×4 sub-block is selected out of the 8×8 predicted block. "LT" represents whether the top surrounding pixels and the left surrounding pixels are available. Because Mode 0 of 8×8 luminance prediction is a DC mode, the computing signal S of OU1-0~0U1-7 are 0.

TABLE 34

The output selection table of Intra_Chroma_DC mode of H.264

| Q | TL | Output selection signals | | | | | | | |
|---|---|---|---|---|---|---|---|---|---|
| | | Sout0 (S0) | Sout1 (S1) | Sout2 (S2) | Sout3 (S3) | Sout4 (S4) | Sout5 (S5) | Sout6 (S6) | Sout7 (S7) |
| 0 | 3 | 8 | 8 | 8 | 8 | 8 | 8 | 8 | 8 |
| 0 | 2 | 8 | 8 | 8 | 8 | 8 | 8 | 8 | 8 |
| 0 | 1 | 8 | 8 | 8 | 8 | 8 | 8 | 8 | 8 |
| 3 | 3 | 8 | 8 | 8 | 8 | 8 | 8 | 8 | 8 |
| 3 | 2 | 8 | 8 | 8 | 8 | 8 | 8 | 8 | 8 |
| 3 | 1 | 8 | 8 | 8 | 8 | 8 | 8 | 8 | 8 |
| 1 | 3, 2 | 8 | 8 | 8 | 8 | 8 | 8 | 8 | 8 |
| 1 | 1 | 8 | 8 | 8 | 8 | 8 | 8 | 8 | 8 |
| 2 | 3, 1 | 8 | 8 | 8 | 8 | 8 | 8 | 8 | 8 |
| 2 | 2 | 8 | 8 | 8 | 8 | 8 | 8 | 8 | 8 |

Mode 2 of 8×8 luminance prediction of AVS (i.e., Intra_8×8_DC mode) and LT=3 is another example in the following. Table 35, Table 36, and Table 37 respectively show its input selection table, computing signal table, and output selection table.

TABLE 32

The input selection table of Intra_Chroma_DC mode of H.264

| Q | TL | Selection signals of Src0 | | | | | | | | Selection signals of Src1 | | | | | | | | Selection signals of Src2 | | | | | | | |
|---|---|---|---|---|---|---|---|---|---|---|---|---|---|---|---|---|---|---|---|---|---|---|---|---|---|
| | | Sin 0 | Sin 1 | Sin 2 | Sin 3 | Sin 4 | Sin 5 | Sin 6 | Sin 7 | Sin 8 | Sin 9 | Sin 10 | Sin 11 | Sin 12 | Sin 13 | Sin 14 | Sin 15 | Sin 16 | Sin 17 | Sin 18 | Sin 19 | Sin 20 | Sin 21 | Sin 22 | Sin 23 |
| 0 | 3 | 0 | 2 | 0 | 0 | 0 | 0 | 0 | 0 | 1 | 2 | 5 | 0 | 0 | 0 | 0 | 0 | 2 | 0 | 0 | 0 | 0 | 0 | 0 | 0 |
| 0 | 2 | 0 | 0 | 0 | 0 | 0 | 0 | 0 | 0 | 3 | 3 | 5 | 0 | 0 | 0 | 0 | 0 | 4 | 0 | 5 | 0 | 0 | 0 | 0 | 0 |
| 0 | 1 | 3 | 3 | 5 | 0 | 0 | 0 | 0 | 0 | 3 | 2 | 5 | 0 | 0 | 0 | 0 | 0 | 2 | 4 | 5 | 0 | 0 | 0 | 0 | 0 |
| 3 | 3 | 4 | 5 | 1 | 0 | 0 | 0 | 0 | 0 | 6 | 4 | 2 | 0 | 0 | 0 | 0 | 0 | 4 | 1 | 3 | 0 | 0 | 0 | 0 | 0 |
| 3 | 2 | 1 | 1 | 1 | 0 | 0 | 0 | 0 | 0 | 3 | 3 | 2 | 0 | 0 | 0 | 0 | 0 | 4 | 5 | 5 | 0 | 0 | 0 | 0 | 0 |
| 3 | 1 | 4 | 5 | 3 | 0 | 0 | 0 | 0 | 0 | 3 | 3 | 5 | 0 | 0 | 0 | 0 | 0 | 4 | 5 | 5 | 0 | 0 | 0 | 0 | 0 |
| 1 | 3, 2 | 1 | 1 | 1 | 0 | 0 | 0 | 0 | 0 | 3 | 3 | 2 | 0 | 0 | 0 | 0 | 0 | 4 | 5 | 5 | 0 | 0 | 0 | 0 | 0 |
| 1 | 1 | 3 | 3 | 5 | 0 | 0 | 0 | 0 | 0 | 3 | 5 | 5 | 0 | 0 | 0 | 0 | 0 | 2 | 4 | 5 | 0 | 0 | 0 | 0 | 0 |
| 2 | 3, 1 | 4 | 5 | 3 | 0 | 0 | 0 | 0 | 0 | 3 | 3 | 5 | 0 | 0 | 0 | 0 | 0 | 4 | 5 | 5 | 0 | 0 | 0 | 0 | 0 |
| 2 | 2 | 0 | 0 | 0 | 0 | 0 | 0 | 0 | 0 | 3 | 3 | 5 | 0 | 0 | 0 | 0 | 0 | 4 | 0 | 5 | 0 | 0 | 0 | 0 | 0 |

TABLE 33

The computing signal table of Intra_Chroma_DC mode of H.264

| Q | TL | Computing signal S | | | | | | | | |
|---|---|---|---|---|---|---|---|---|---|---|
| | | OU1-0 | OU1-1 | OU1-2 | OU1-3 | OU1-4 | OU1-5 | OU1-6 | OU1-7 | OU2 |
| 0 | 3 | 0 | 0 | 0 | 0 | 0 | 0 | 0 | 0 | 3 |
| 0 | 2 | 0 | 0 | 0 | 0 | 0 | 0 | 0 | 0 | 2 |
| 0 | 1 | 0 | 0 | 0 | 0 | 0 | 0 | 0 | 0 | 1 |
| 3 | 3 | 0 | 0 | 0 | 0 | 0 | 0 | 0 | 0 | 3 |
| 3 | 2 | 0 | 0 | 0 | 0 | 0 | 0 | 0 | 0 | 2 |
| 3 | 1 | 0 | 0 | 0 | 0 | 0 | 0 | 0 | 0 | 1 |
| 1 | 3, 2 | 0 | 0 | 0 | 0 | 0 | 0 | 0 | 0 | 1 |
| 1 | 1 | 0 | 0 | 0 | 0 | 0 | 0 | 0 | 0 | 1 |
| 2 | 3, 1 | 0 | 0 | 0 | 0 | 0 | 0 | 0 | 0 | 1 |
| 2 | 2 | 0 | 0 | 0 | 0 | 0 | 0 | 0 | 0 | 2 |

TABLE 35

The input selection table of Intra_8 × 8_DC mode of AVS and when LT = 3

| | Selection signals of Src0 | | | | | | | | Selection signals of Src1 | | | | | | | | Selection signals of Src2 | | | | | | | |
|---|---|---|---|---|---|---|---|---|---|---|---|---|---|---|---|---|---|---|---|---|---|---|---|---|
| Location | Sin 0 | Sin 1 | Sin 2 | Sin 3 | Sin 4 | Sin 5 | Sin 6 | Sin 7 | Sin 8 | Sin 9 | Sin 10 | Sin 11 | Sin 12 | Sin 13 | Sin 14 | Sin 15 | Sin 16 | Sin 17 | Sin 18 | Sin 19 | Sin 20 | Sin 21 | Sin 22 | Sin 23 |
| 000 | 5 | 2 | 2 | 2 | 2 | 2 | 6 | 1 | 0 | 0 | 0 | 4 | 6 | 3 | 7 | 4 | 2 | 5 | 5 | 0 | 0 | 0 | 0 | 2 |
| 001 | 0 | 3 | 6 | 3 | 6 | 5 | 3 | 4 | 1 | 3 | 5 | 4 | 0 | 2 | 1 | 0 | 4 | 0 | 0 | 0 | 2 | 0 | 4 | 5 |
| 010 | 2 | 6 | 1 | 1 | 2 | 2 | 6 | 3 | 3 | 1 | 5 | 1 | 1 | 1 | 7 | 1 | 2 | 1 | 2 | 4 | 5 | 6 | 2 | 5 |
| 011 | 2 | 1 | 6 | 4 | 3 | 5 | 3 | 6 | 1 | 3 | 5 | 4 | 1 | 1 | 3 | 1 | 4 | 2 | 1 | 1 | 5 | 4 | 4 | 3 |
| 100 | 4 | 5 | 7 | 0 | 4 | 3 | 0 | 1 | 0 | 0 | 5 | 2 | 6 | 3 | 4 | 2 | 4 | 5 | 0 | 4 | 0 | 0 | 4 | 5 |
| 101 | 0 | 0 | 5 | 5 | 6 | 7 | 1 | 5 | 6 | 3 | 0 | 4 | 0 | 3 | 5 | 0 | 4 | 3 | 3 | 0 | 4 | 0 | 7 | 5 |
| 110 | 4 | 4 | 7 | 1 | 7 | 1 | 6 | 2 | 7 | 4 | 5 | 2 | 6 | 3 | 4 | 2 | 4 | 5 | 1 | 4 | 1 | 5 | 1 | 5 |
| 111 | 1 | 1 | 5 | 5 | 1 | 7 | 6 | 5 | 6 | 3 | 1 | 0 | 6 | 6 | 3 | 1 | 4 | 3 | 3 | 4 | 4 | 6 | 7 | 5 |

TABLE 36

The computing signal table of Intra_8 × 8_DC mode of AVS and when LT = 3

| | Computing signal S | | | | | | | |
|---|---|---|---|---|---|---|---|---|
| Location | OU1-0 | OU1-1 | OU1-2 | OU1-3 | OU1-4 | OU1-5 | OU1-6 | OU1-7 | OU2 |
| 000 | 1 | 1 | 1 | 1 | 1 | 1 | 1 | 1 | 1 |
| 001 | 1 | 1 | 1 | 1 | 1 | 1 | 1 | 1 | 1 |
| 010 | 1 | 1 | 1 | 1 | 1 | 1 | 1 | 1 | 1 |
| 011 | 1 | 1 | 1 | 1 | 1 | 1 | 1 | 1 | 1 |
| 100 | 1 | 1 | 1 | 1 | 1 | 1 | 1 | 1 | 1 |
| 101 | 1 | 1 | 1 | 1 | 1 | 1 | 1 | 1 | 1 |
| 110 | 1 | 1 | 1 | 1 | 1 | 1 | 1 | 1 | 1 |
| 111 | 1 | 1 | 1 | 1 | 1 | 1 | 1 | 1 | 1 |

TABLE 37

The output selection table of Intra_8 × 8_DC mode of AVS and when LT = 3

| | Output selection signals | | | | | | | |
|---|---|---|---|---|---|---|---|---|
| Location | Sout0 (S0) | Sout1 (S1) | Sout2 (S2) | Sout3 (S3) | Sout4 (S4) | Sout5 (S5) | Sout6 (S6) | Sout7 (S7) |
| 000 | 4 | 0 | 3 | 7 | 5 | 6 | 1 | 2 |
| 001 | 5 | 2 | 3 | 6 | 0 | 4 | 7 | 1 |
| 010 | 1 | 4 | 2 | 0 | 5 | 6 | 7 | 3 |
| 011 | 2 | 4 | 7 | 6 | 5 | 1 | 3 | 0 |
| 100 | 5 | 0 | 6 | 3 | 4 | 2 | 1 | 7 |
| 101 | 0 | 1 | 7 | 6 | 5 | 4 | 3 | 2 |
| 110 | 6 | 1 | 0 | 3 | 2 | 5 | 4 | 7 |
| 111 | 0 | 1 | 7 | 6 | 4 | 2 | 5 | 3 |

The present invention generalizes every intra-frame prediction algorithm as unified formulae. Therefore, when an input selection signal, a computing signal, and an output selection signal are provided, every video intra-frame prediction algorithm may be realized. According to the prediction modes, the input selection signals, the computing signal, and the output selection signal may be established in the intra-frame prediction apparatus in advance as loop-up tables. Since the intra-frame prediction apparatus provided in the present invention is suitable for all intra-frame predictions simultaneously, the functionality may be realized by simple electronic circuits, and the present invention consequently save hardware resources.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An intra-frame prediction apparatus, comprising:
   an input data unit, providing a part of or the whole of surrounding pixels of a predicted block;
   a control unit, providing an input selection signal, a computing signal, and an output selection signal;
   a selection unit, coupled to the input data unit and the control unit, selecting the surrounding pixels according to the input selection signal;
   a processing unit, coupled to the selection unit, computing the surrounding pixels selected by the selection unit according to the computing signal and producing a plurality of computing results; and
   an output data unit, coupled to the processing unit and the control unit, selecting a part of or the whole of the computing results according to the output selection signal;
   wherein the processing unit comprises a plurality of first operation units; one of the first operation units computes the following equation according to the computing signal for acquiring a computing result Tn:

$$Tn = (Src0 + Src1 << C + Src2 + R) >> S,$$

wherein S is the computing signal, Src0, Src1, and Src2 are the surrounding pixels selected by the selection unit, "Src1<<C" represents left shift the pixel Src1 by C digits, "(Src0+ . . . +R)>>S" represents right shift "(Src0+ . . . +R)" by S digits, R is S or 0, and C=R>>1.

2. The intra-frame prediction apparatus as claimed in claim 1 wherein the selection unit comprises:
   a plurality of multiplexers, coupled between the input data unit and the processing unit, selecting the surrounding pixels according to the input selection signal and providing the surrounding pixels selected for calculation.

3. The intra-frame prediction apparatus as claimed in claim 1 wherein R=0 if a intra-frame prediction mode of the intra-frame prediction apparatus is INTRA_8*8_DC mode of AVS, and the surrounding pixels of the predicted block are all available.

4. The intra-frame prediction apparatus as claimed in claim 3 wherein one of the first operation units comprising:
   a first switcher, receiving the computing signal S, wherein if the intra-frame prediction mode is the INTRA_8*8_DC mode of AVS, and the surrounding pixels of the predicted block are all available, then the first switcher outputs a value "0" as a parameter R, otherwise, first switcher outputs the computing signal S as the parameter R;
   a first right shifter, coupled to the first switcher, right shifting the parameter R by 1 digit as a parameter C;
   a first left shifter, coupled to the output data unit and the first right shifter, shifting a surrounding pixel Src1 of the surrounding pixels selected by the selection unit by C digits to the left;
   a first adder, coupled to the selection unit, the first switcher, and the first left shifter, summing up surrounding pixels Src0 and Src2 of the surrounding pixels selected by the selection unit, an output of the first left shifter, and the parameter R; and
   a second right shifter, coupled to the first adder, right shifting an output of the first adder by S digits as the computing result Tn.

5. The intra-frame prediction apparatus as claimed in claim 3 wherein the processing unit further comprises:
   a second operation unit, computing the following equation according to the computing signal S and acquiring a computing result Tn':
   $$Tn'=(T0+T1+T2+R')>>S'$$
   wherein T0, T1, and T2 are the computing results of the first operation units, S'=S+1, and R'=1<<S.

6. The intra-frame prediction apparatus as claimed in claim 3 wherein the processing unit further comprises:
   a second operation unit, computing the following equation according to the computing signal S and acquiring a computing result Tn':
   $$Tn'=((T0+T1+T2)+(T0'+T1'+T2')+R')>>S'$$
   wherein (T0, T1, T2) and (T0', T1', T2') are computing results of the first operation units, S'=S+1, and R'=1<<S.

7. The intra-frame prediction apparatus as claimed in claim 6 wherein the second operation unit comprises:
   a second adder, summing up a value "1" to the computing signal S as a parameter S';
   a second left shifter, left shifting the value "1" by S digits as a parameter R';
   a register, temporarily recording a current value and providing a previous value;
   a second switcher, coupled to the second left shifter and the register, selecting for outputting either the parameter R' or the previous value;
   a third adder, summing up the computing results T0, T1 and T2, and an output of the second switcher as the current value;
   a third righter shifter, coupled to the third adder and the second adder, right shifting the current value by S' digits; and
   a third switcher, coupled to the third righter shifter, selecting and outputting either a value "128" or an output of the third right shifter as the computing result Tn'.

8. The intra-frame prediction apparatus as claimed in claim 1 wherein the control unit, according to a prediction mode, refers to an input selection table, a computing signal table, and an output selection table for acquiring the input selection signal, the computing signal, and the output selection signal.

9. An intra-frame prediction method, comprising:
   providing a part of or the whole of surrounding pixels of a predicted block by an input data unit;
   providing an input selection signal, a computing signal, and an output selection signal by a control unit;
   selecting at least one of the surrounding pixels as at least a selected pixel according to the input selection signal by a selection unit;
   computing the selected pixel according to the computing signal and producing a plurality of computing results by a processing unit; and
   selecting a part of or the whole of the computing results according to the output selection signal by an output data unit;
   wherein the step of computing the selected pixel comprising:
   calculating an equation Tn=(Src0+Src1<<C+Src2+R)>>S, according to the computing signal, for acquiring a computing result Tn,
   wherein S is the computing signal, Src0, Src1, and Src2 are the selected pixels, "Src1<<C" represents left shifting the pixel Src1 by C, "(Src0+ . . . +R)>>S" represents right shifting the pixels "(Src0+ . . . +R)" by S digits to the right, R=S, and C=R>>1.

10. The intra-frame prediction method as claimed in claim 9, wherein R=0 if INTRA_8*8_DC mode of AVS is practiced, and the surrounding pixels of the predicted block are all available.

11. The intra-frame prediction method as claimed in claim 9 further comprising:
   referring to an input selection table according to a prediction mode for acquiring the input selection signal;
   referring to a computing signal table according to the prediction mode for acquiring the computing signal; and
   referring to an output selection table according to the prediction mode for acquiring the output selection signal.

* * * * *